United States Patent
Soma et al.

(10) Patent No.: US 12,279,637 B2
(45) Date of Patent: Apr. 22, 2025

(54) COMPOSITION WITH SOLUBLE RICE BRAN EXTRACT

(71) Applicant: Florida Food Products, LLC, Eustis, FL (US)

(72) Inventors: Pavan Kumar Soma, Eustis, FL (US); Peter VanAlstyne, Eustis, FL (US)

(73) Assignee: Florida Food Products, LLC, Eustis, FL (US)

( * ) Notice: Subject to any disclaimer, the term of this patent is extended or adjusted under 35 U.S.C. 154(b) by 0 days.

(21) Appl. No.: 18/370,279

(22) Filed: Sep. 19, 2023

(65) Prior Publication Data
US 2024/0000115 A1 Jan. 4, 2024

Related U.S. Application Data

(60) Continuation of application No. 17/903,563, filed on Sep. 6, 2022, now Pat. No. 11,785,970, which is a division of application No. 16/672,102, filed on Nov. 1, 2019, now Pat. No. 11,484,051.

(60) Provisional application No. 62/811,905, filed on Feb. 28, 2019, provisional application No. 62/754,035, filed on Nov. 1, 2018.

(51) Int. Cl.
| *A23L 7/10* | (2016.01) |
| *A23L 5/20* | (2016.01) |
| *A23L 13/00* | (2016.01) |
| *A23L 17/00* | (2016.01) |

(52) U.S. Cl.
CPC .......... *A23L 7/115* (2016.08); *A23L 5/21* (2016.08); *A23L 5/273* (2016.08); *A23L 13/03* (2016.08); *A23L 17/75* (2016.08); *A23V 2002/00* (2013.01)

(58) Field of Classification Search
CPC .......... A23L 7/115; A23L 13/03; A23L 17/75; A23L 5/21; A23L 5/273; A23V 2002/00
See application file for complete search history.

(56) References Cited

U.S. PATENT DOCUMENTS

| 3,591,665 | A | 7/1971 | Kimura et al. |
| 4,668,813 | A | 5/1987 | Ogawa et al. |
| 11,484,051 | B2 | 11/2022 | Soma et al. |
| 11,785,970 | B2 | 10/2023 | Soma et al. |
| 2002/0086069 | A1* | 7/2002 | McPeak .................. A23L 33/11 |
| | | | 435/68.1 |
| 2005/0053640 | A1 | 3/2005 | Hettiarachchy et al. |
| 2005/0106311 | A1 | 5/2005 | Okita et al. |
| 2006/0093592 | A1* | 5/2006 | Cheruvanky ............. A61P 3/04 |
| | | | 514/102 |
| 2007/0231449 | A1 | 10/2007 | Cherukuri et al. |

(Continued)

FOREIGN PATENT DOCUMENTS

| CN | 1366025 A | 8/2002 |
| CN | 102127108 A | 7/2011 |

(Continued)

OTHER PUBLICATIONS

English Translation for JP2005333851 published Dec. 8, 2005.*

(Continued)

*Primary Examiner* — Anthony J Weier
(74) *Attorney, Agent, or Firm* — Greenberg Traurig, LLP; David J. Dykeman; Roman Fayerberg

(57) ABSTRACT

Aspects of the present disclosure relate to compositions having rice bran extract, method of making rice bran extract and method of using same.

16 Claims, 19 Drawing Sheets

Process Flow Chart

(56) References Cited

U.S. PATENT DOCUMENTS

| | | | | |
|---|---|---|---|---|
| 2008/0038385 A1* | 2/2008 | Cherukuri | ............... | A23L 33/22 424/750 |
| 2008/0254167 A1 | 10/2008 | McMindes et al. | | |
| 2009/0123580 A1* | 5/2009 | Patel | ............... | A23L 7/115 424/750 |
| 2009/0252832 A1* | 10/2009 | Falk | ............... | A22C 9/00 426/59 |
| 2013/0302448 A1* | 11/2013 | Parc | ............... | A23L 33/18 426/74 |
| 2021/0345649 A1 | 11/2021 | Soma et al. | | |

FOREIGN PATENT DOCUMENTS

| | | | |
|---|---|---|---|
| CN | 103980305 | A | 8/2014 |
| JP | 57125648 | A | 8/1982 |
| JP | 61109730 | A | 5/1986 |
| JP | 62241985 | A | 10/1987 |
| JP | 2002020307 | A | 1/2002 |
| JP | 2005333851 | * | 12/2005 |
| JP | 2007029090 | A | 2/2007 |
| JP | 4782620 | B2 | 9/2011 |
| KR | 20150008638 | A | 1/2015 |
| WO | 2008124629 | A1 | 10/2008 |

OTHER PUBLICATIONS

Choi et al., "Effects of Fat Levels and Rice Bran Fiber on the chemical, textural, and sensory properties of Frankfurters," Food Science and Biotechnology, Apr. 30, 2015, vol. 24, No. 2, pp. 489-495.

Choi et al.,"Characteristics of low-fat meat emulsion systems with pork fat replaced by vegetable oils and rice bran fiber," Meat Science, 2009, vol. 82, pp. 266-271.

Graf, Ernst, "Applications of Phytic Acid," Journal of the American Oil Chemists' Society, Nov. 1, 1983, vol. 80, No. 11, pp. 1861-1875.

Khokhlova et al., "Adsorption and Surface Properties of Vladipor Cellulose Acetate and Polysulfonamide Membranes", Colloid Journal of the Russian Academy of Sciences—Kolloidnyyie Zhurnal, Consultants Bureau, New York, vol. 67, No. 6, pp. 760-763, Nov. 1, 2005.

Makarenko et al., "Composition and Structure of Phytic Acid Derivatives from Rice Bran," Bioresources, 2018, vol. 13, No. 2, pp. 3411-3419.

Somnuk, "The effect of rice-bran extract on fat metabolism in rats fed a high-fat diet," A dissertation submitted in partial fulfillment of the requirements for the degree of the Doctor of Philosophy in Medical Sciences, 2016, pp. 1-117.

Sunil et al., "Preparation of food supplements from oilseed cakes," Journal of Food Science and Technology, 2014, vol. 52, Iss. 5, pp. 2998-3005.

Wang et al., "Techniques for Producing Phytin (translated)" Database FSTA[Online], International Food Information Service (IFIS), Frankfurt-Main, Germany, Database accession No. FS-1996-06-M-0043; & No. 3, p. 34, Jun. 1996.

International Search Report and Written Opinion in corresponding PCT Patent Application No. PCT/ US2019/059509 mailed Mar. 2, 2020.

Champagne et al., "Solubility Behaviors of the Minerals, Proteins, and Phytic Acid in Rice Bran with Time, Temperature, and pH", Cereal Chem., vol. 62, No. 3, pp. 218-222, 1985.

Justo et al., "Water-Soluble Rice Bran Enzymatic Extract Attenuates Dyslipidemia, Hypertension and Insulin Resistance in Obese Zucker Rats"Eur. J. Nutr., vol. 52, pp. 789-797, 2013.

* cited by examiner

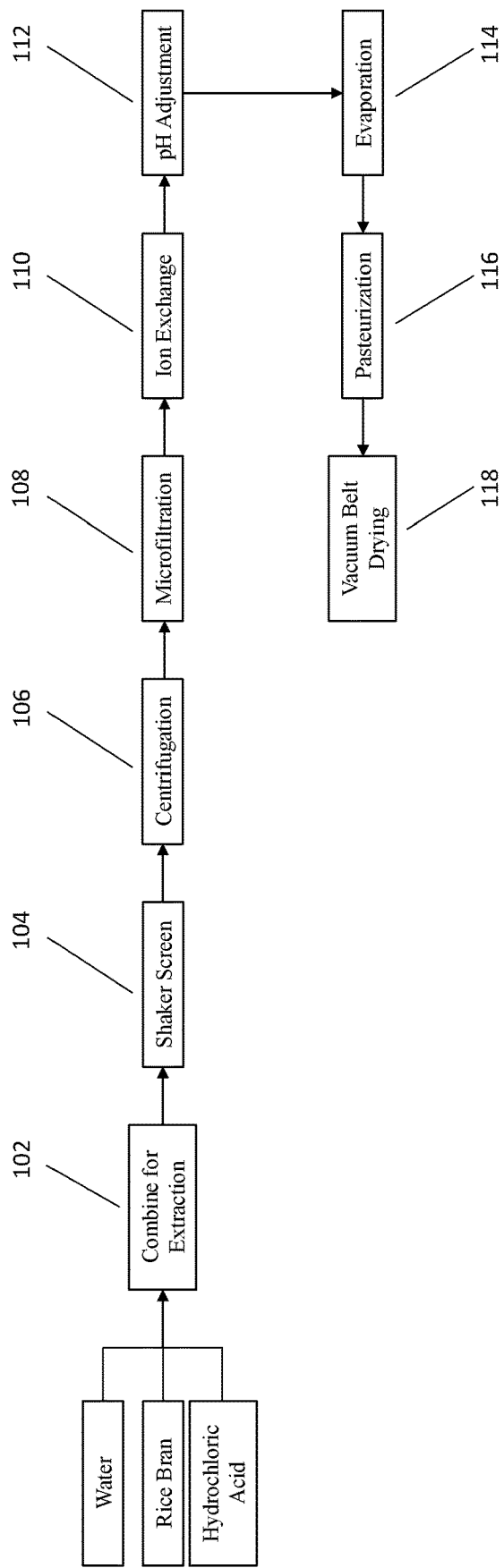
Figure 1. Process Flow Chart

COMPOSITION WITH SOLUBLE RICE BRAN EXTRACT

CROSS-REFERENCE TO RELATED APPLICATION

This application is a continuation application of U.S. application Ser. No. 17/903,563, filed Sep. 6, 2022, now U.S. Pat. No. 11,785,970, which is a divisional application of U.S. application Ser. No. 16/672,102 filed on Nov. 1, 2019, now U.S. Pat. No. 11,484,051, which claims the benefit of priority of the following U.S. Provisional Application No. 62/754,035 filed Nov. 1, 2018, and U.S. Provisional Application No. 62/811,905 filed Feb. 28, 2019, the entire contents of each are incorporated herein by reference.

FIELD

The present disclosure relates to compositions comprising rice bran extract, method of making rice bran extract and method of using same. In particular, the disclosure provides compositions and methods for use in meat, poultry and seafood products.

BACKGROUND

Before reaching a consumer, all-natural meat and seafood products are either stored or processed in some way. Water and proteins constitute a large portion of meat and seafood. Storing, processing or cooking results in loss of water, weight loss and loss of structural integrity. There is a need for a natural material that can be used with a meat product to restore its properties.

SUMMARY

One aspect of the present disclosure provides a composition for treating a meat product or seafood product. The composition includes a rice bran extract having between about 3% and about 9% (w/w) total phosphorous content, wherein a treatment of the meat product or seafood product with the rice bran extract improves water retention in the meat or seafood product. In some embodiments, the rice bran extract comprises between about 5% to about 7% (w/w) total phosphorous content. In some embodiments, the rice bran extract comprises from about 0.003% to about 0.08% total calcium content. In some embodiments, wherein the rice bran extract further comprises one or more of: from about 45% to about 55% (w/w) ash, from about 25% to about 45% (w/w) carbohydrate, from about 4% to about 12% (w/w) protein, from about 3% to about 10% (w/w) dietary fiber. In some embodiments, the rice bran extract further comprises from about 45% to about 55% (w/w) ash, from about 25% to about 45% (w/w) carbohydrate, from about 4% to about 12% (w/w) protein, and from about 3% to about 10% (w/w) dietary fiber. In some embodiments, the rice bran extract comprises less than about 0.2% (w/w) fat. In some embodiments, the rice bran extract comprises from about 15% to about 22% (w/w) total sodium content. In some embodiments, the rice bran extract comprises between about 1% to about 12% by weight moisture. In some embodiments, the rice bran extract has 120-150 kcal. In some embodiments, the meat product or seafood product treated with the rice bran extract has a cooked weight yield that is at least 5% greater than a control comprising the untreated cooked meat product or seafood product.

Another aspect of the present disclosure provides a composition comprising (a) a rice bran extract having between about 3% and about 9% (w/w) total phosphorous content and (b) a natural curing agent comprising a nitrite source. In some embodiments, the rice bran extract comprises between about 5% to about 7% (w/w) total phosphorous content. In some embodiments, the rice bran extract comprises from about 0.003% to about 0.08% total calcium content. In some embodiments, the nitrite source comprises a nitrate salt or nitrite salt. In some embodiments, wherein the rice bran extract further comprises one or more of: from about 45% to about 55% (w/w) ash, from about 25% to about 45% (w/w) carbohydrate, from about 4% to about 12% (w/w) protein, from about 3% to about 10% (w/w) dietary fiber. In some embodiments, the rice bran extract further comprises from about 45% to about 55% (w/w) ash, from about 25% to about 45% (w/w) carbohydrate, from about 4% to about 12% (w/w) protein, and from about 3% to about 10% (w/w) dietary fiber. In some embodiments, the rice bran extract comprises less than about 0.2% (w/w) fat. In some embodiments, the rice bran extract comprises from about 15% to about 22% (w/w) total sodium content. In some embodiments, the rice bran extract comprises between about 1% to about 12% by weight moisture. In some embodiments, the rice bran extract has 120-150 kcal. In some embodiments, the composition also includes from about 45% (w/w) to about 70% (w/w) rice bran extract, from about 10% (w/w) to about 30% (w/w) nitrite source, and from about 1% (w/w) to about 40% (w/w) sea salt. In some embodiments, the composition includes 50% (w/w) rice bran extract, 27.8% nitrite source, and 20.8% sea salt. In some embodiments, the composition is liquid. In some embodiments, the composition is solid.

A method is provided in another aspect for treating a meat product or seafood product, the method involves contacting the meat product or seafood product with a composition comprising rice bran extract between about 3% and about 9% (w/w) total phosphorous content, wherein the treatment of the meat product or seafood product with the rice bran extract improves water retention in the meat or seafood product. In some embodiments, the rice bran extract comprises between about 5% to about 7% (w/w) total phosphorous content. In some embodiments, the rice bran extract comprises from about 0.003% to about 0.08% total calcium content. In some embodiments, the meat product or seafood product treated with the rice bran extract has a cooked weight yield that is at least 5% greater than a control comprising the untreated cooked meat product or seafood product. In some embodiments, the composition comprises the rice bran extract and a natural curing agent comprising a nitrite source. In some embodiments, the nitrite source comprises a nitrate salt or nitrite salt. In some embodiments, the meat product comprises poultry, lamb, beef, pork, combinations thereof. In some embodiments, the method involves contacting the meat product with about 0.5% to about 2% by weight of the rice bran extract. In some embodiments, the method involves contacting the seafood product with a solution comprising about 5% by weight of the rice bran extract. In some embodiments, the method involves contacting the meat product or seafood product with (a) the rice bran extract, and (b) a synthetic antioxidant, a natural antioxidant, a synthetic curing agent, pH buffering agents, a natural curing agent, an antimicrobial or combinations thereof. In some embodiments, the rice bran extract further comprises one or more of: from about 45% to about 55% (w/w) ash, from about 25% to about 45% (w/w) carbohydrate, from about 4% to about 12% (w/w) protein, from about 3% to about 10% (w/w) dietary fiber. In some embodiments, the rice bran extract further comprises from about 45% to about 55% (w/w) ash, from about 25% to about 45% (w/w) carbohydrate, from about 4% to about 12% (w/w) protein, and from about 3% to about 10% (w/w) dietary fiber. In some embodiments, the rice bran extract comprises less than about 0.2% (w/w) fat. In some embodiments, the rice bran extract comprises from about 15% to about 22% (w/w) total sodium content. In some embodiments, the rice bran extract comprises between about 1% to about 12% by weight moisture. In some embodiments, the rice bran extract has 120-150 kcal. In some embodiments, the composition comprises from about 45% (w/w) to about 70% (w/w) rice bran extract, from about 10% (w/w) to about 30% (w/w) nitrite source, and from about 1% (w/w) to about 40% (w/w) sea salt. In some embodiments, the composition comprises 50% (w/w) rice bran extract, 27.8% nitrite source, and 20.8% sea salt.

Another aspect provides a method involving incubating rice bran with water and acid to form a mixture having a pH ranging from 0.5 to 4 at room temperature; separating suspended solids from the mixture comprising a soluble portion and suspended solids; contacting the soluble portion to an ion exchange resin; adjusting the pH of the soluble portion to pH 4 to 11; subjecting the rice bran extract to evaporation; and drying rice bran extract. In some embodiments, in the step incubating, the mixture has a pH ranging from 1 to 2.5. In some embodiments, in the step of incubating is from about 10 minutes to about 2 hours. In some embodiments, in the step of adjusting the pH, the pH is adjusted to a pH of from about 7 to about 9. In some embodiments, the step of incubating comprises adding hydrochloride acid to the mixture. In some embodiments, the step of separating is by centrifugation, microfiltration or combinations thereof. In some embodiments, in the step of contacting the ion exchange resin is a cationic exchange resin. In some embodiments, the step of adjusting the pH comprises adding sodium hydroxide. In some embodiments, the step of subjecting the rice bran extract to evaporation comprises evaporating using a low temperature evaporator. In some embodiments, the step of drying comprises drying using a continuous vacuum belt dryer. In some embodiments, the rice bran is fresh rice bran. In some embodiments, the process removes from about 5% to about 25% (w/w) carbohydrates, from about 8% to about 14% (w/w) proteins, from about 15% to about 30% oil/fat of the rice bran.

BRIEF DESCRIPTION OF THE DRAWINGS

The present disclosure is further described in the detailed description which follows, in reference to the noted plurality of drawings by way of non-limiting examples of exemplary embodiments, in which like reference numerals represent similar parts throughout the several views of the drawings, and wherein:

FIG. 1 provide a schematic process flow chart showing a method of preparing of Rice Bran Extract.

Figure 3:
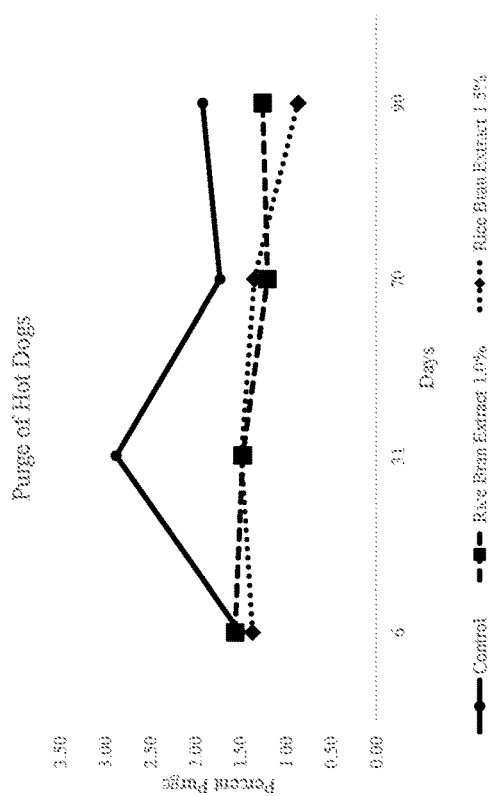
FIG. 3 is a graph showing the effect of rice bran extract on purge of hotdogs according to some embodiments of the invention.

While the above-identified drawings set forth presently disclosed embodiments, other embodiments are also contemplated, as noted in the discussion. This disclosure presents illustrative embodiments by way of representation and not limitation. Numerous other modifications and embodiments can be devised by those skilled in the art which fall within the scope and spirit of the principles of the presently disclosed embodiments.

DETAILED DESCRIPTION

The present disclosure relates generally to food additive which enhances moisture retention to the food it is added to. In some embodiments, the present disclosure relates to compositions, method of making and method of using rice bran extract and compositions comprising rice bran extract.

Process for Making Rice Bran Extract

In some aspects of the disclosure, a process to generate rice bran extract from rice bran is provided.

The rice bran extract can be produced from freshly milled rice bran derived from any rice milling operation from any type of rice. Raw material is not limited to freshly derived rice bran. For example, rice bran under proper storage conditions to minimize degradation can be used as a raw material for this process. Stabilized rice bran, either chemically or heat-treated rice bran to reduce rancidity of rice bran can be used in some embodiments. In some embodiments, de-fatted and/or de-oiled rice bran can be used. In some embodiments, a combination of rice bran and rice hulls can be used.

As described in FIG. 1, a quantity of rice bran can be added to a batch tank and suspended in water and acid (102) to achieve a pH ranging from 0.2-4 for a period of time sufficient for components of the rice bran to be solubilized. In some embodiments, the rice bran is suspended in about 1000 gallons of deionized water. In some embodiments, between 100 and 3000 pounds of rice bran is added to the batch tank. In some embodiments, between 500 and 2500 pounds of rice bran is added to the batch tank. In some embodiments, between about 100 and 2000 pounds, between about 100 and 1500 pounds, between about 100 and 1000 pounds between about 100 and 500 pounds or between 500 and 3000 pounds, between 1000 and 3000 pounds, between 1500 and 2000 pounds, or between 2500 and 3000 pounds of rice bran is added to the batch tank. In some embodiments, the pH can range from 1 to 2, from about 0.2 to 4, from about 0.2 to 3.5, from about 0.2 to 3, from about 0.2 to 2.5, from about 0.2 to 2, from about 0.2 to 1.5, from about 0.2 to 1, from about 0.5 to 4, from about 1.0 to 4, from about 1.5 to 4, from about 2.0 to 4, from about 2.5 to 4, from about 3.0 to 4, or from about 3.5 to 4, from 1.5 to 2, from 1 to 2.5, from 0.4 to 2.5, from 1.5 to 2.5, from 2 to 2.5, from 1.5 to 3, from 1 to 3, from 0.4 to 3, from 1.5 to 3, from 2 to 3, from 2.5 to 3, from 0.4 to 3.5, from 1 to 3.5, from 1.5 to 3.5, from 2 to 3.5, from 2.5 to 3.5, from 3 to 3.5, from 1 to 4, from 1.5 to 4, from 2 to 4, from 2.5 to 4, from 3 to 4, or from 3.5 to 4. In some embodiments, the pH ranges from 1 to 2. In some embodiments, the pH is about 0.5, about 1, about 1.5, about 2, about 2.5, about 3, about 3.5, or about 4. In some embodiments, the mixture can be treated at a temperature ranging from 4-100° C. In some embodiments, the temperature of the mixture is 20-65° C. In some embodiments, the temperature of the mixture is ambient temperature. In some embodiments, the temperature of the mixture is about 35° C., 40° C., 45° C., 60° C. 65° C. In some embodiments, the temperature of the mixture is from 35 to 40° C., 35 to 45° C., 35 to 50° C., 35 to 55° C., 35 to 60° C., 35 to 65° C., 40 to 45° C., 40 to 50° C., 40 to 55° C., 40 to 60° C., 40 to 65° C., 45 to 50° C., 45 to 55° C., 45 to 60° C., 45 to 65° C., 50 to 55° C., 50 to 60° C., 50 to 65° C., 55 to 60° C., 55 to 65° C., 60 to 65° C. In some embodiments, the mixture is agitated. In some embodiments, the rice bran can be treated from 1 min to 24 hours, from 1 min to 1 hour, 10 minutes to 1 hour, from 10 minutes to 2 hours from 1 hour to 2 hours, from 2 to 3 hours, from 3 to 4 hours, from 4 to 5 hours, from 5 to 6 hours, from 6 to 7 hours, from 7 to 8 hours, from 8 to 10 hours, from 10 to 11 hours, from 11 to 12 hours, from 12 to 13 hours, from 13 to 14 hours, from 14 to 15 hours, from 15 to 16 hours, from 16 to 17 hours, from 17 to 18 hours, from 18 to 19 hours, from 19 to 20 hours, from 20 to 21 hours, from 21 to 22 hours, from 22 to 23 hours, or from 23 to 24 hours. In some embodiments, the rice bran extract can be treated from 1 to 2 hours, for example, 1 hour, 1.5 hour, or 2 hours. In some embodiments, the rice bran extract can be treated for between about 1 to 2 hours.

The acid can be any mineral or organic acid strong enough to reduce the pH of the suspension to required level and suitable for batch extraction of rice bran components. Examples of acids that can be used but are not limited for this purpose are hydrochloric acid, acetic acid, nitric acid etc. In some embodiments, the acid is strong enough to reduce the pH of the suspension to a pH ranging from 1 to 2.

Referring again to FIG. 1, the soluble components of the suspension are then applied to a shaker screen (104). A shaker screen allows a crude separation of larger particulate matter from smaller particulate matter and dissolved matter. The duration of the shaker screen separation can be modified depending on the condition of the crude extract, as is known by those skilled in the art. In some embodiments, the components of the suspension can be further separated from insoluble components of rice bran by one or more processes known in the art. In some embodiments, the insoluble components can be removed by bag filtration, shaker screen filtration, gravity decantation, centrifugation, or membrane filtration. For example, in some embodiments, the components in the solution are further separated from insoluble components by centrifugation (106) and microfiltration (108) (e.g., with a 2 µm filter). In some embodiments, the insoluble components that are removed can include carbohydrates, proteins, oil/fat and any other insoluble component. In some embodiments, about 5-25% carbohydrates, about 8-14% proteins, and about 15-30% oil/fat and combinations thereof can be removed during the process described herein. The soluble portion of suspension contains proteins, fats, carbohydrates, organic and inorganic compounds commonly found in rice bran. In some embodiments, the rice bran extract can have a finished composition of moisture 1-12%, protein 4-12%, fat/oil<0.2%, dietary fiber 3-10%, ash 40-55%, carbohydrate 25-55%, total phosphorous content 4-7%, and calcium 0.03-0.01%.]

Next, the rice bran extract with complete removal or substantially complete removal of insoluble particulates and/or suspended solids can be treated with ion exchange resin to remove the divalent and trivalent ions present in the liquid extract to make it more soluble and functional at neutral pH (110). In some embodiments, at least 85%, at least 86%, at least 87%, at least 88%, at least 89%, at least 90%, at least 91%, at least 92%, at least 93%, at least 94%, at least 95%, at least 96%, at least 97%, at least 98%, at least 99%, at least 99.5%, at least 99%, at least 99.5%, or at least 99.9% of divalent and trivalent ions are removed from the rice bran extract. Ion exchange could be any resin known in the art for removing excessive ions present in a solution or ones used for purification purposes. Alternative technologies known in the art to separate metal ions such as, but not limited to, electrodialysis, membrane filtration systems such as ultrafiltration, and nanofiltration can be used to process rice bran extract.

Rice bran extract after ion exchange resin treatment can be pH adjusted to neutral or any pH suitable for application of interest (112). Specific pH ranges for rice bran extract can depend on the pH of the finished application and can be formulated such that a significant shift in pH is not observed in the finished application due to the addition of rice bran extract. Any commonly known organic or inorganic bases can be used to adjust pH including, but not limited to, sodium hydroxide, sodium carbonate, sodium bicarbonate, potassium hydroxide, ammonium hydroxide, and similar buffers known in the art. In some embodiments, the pH could be adjusted to range from pH 4 to pH 11. pH ranging from 4-7 is very common for food ingredients. pH up to pH 11 is common for meat ingredients. In some embodiments, the pH is adjusted to between about 4 and between about 4 and 10, between about 4 and 9.5, between about 4 and 9.0, between about 4 and 8.5, between about 4 and 8.0, between about 4 and 7.5, between about 4 and 7.0, between about 4 and 6.5, between about 4 and 6.0, between about 4 and 5.5, between about 4 and 5.0, between about 4 and 4.5, between about 4.5 and 11, between about 5.0 and 11.0, between about 5.5 and 11, between about 6.0 and 11.0, between about 6.5 and 11, between about 7.0 and 11.0, between about 7.5 and 11, between about 8.0 and 11.0, between about 8.5 and 11, between about 9.0 and 11.0, between about 9.5 and 11, between about 10.0 and 11.0, or between about 10.5 and 11. In some embodiments, the pH is adjusted to between about 7 and 9.

Next, the pH adjusted rice bran extract can be vacuum evaporated to remove excess water to increase the concentration of solids in solution (e.g. % weight solid in solution) (114). In some embodiments, the rice bran extract is then pasteurized (116). In some embodiments, prior to evaporation, the rice bran extract can have between about 0.5 and 12% soluble solids. In some embodiments, the amount of soluble solids in the rice bran extract is between about 0.5 and 12%, between about 0.5 and 10%, between about 0.5 and 8%, between about 0.5 and 6%, between about 0.5 and 4%, between about 0.5 and 2%, between about 0.5 and 1%, between about 1 and 12%, between about 2 and 12%, between about 4 and 12%, between about 6 and 12%, between about 8 and 12%, or between about 10 and 12%. In some embodiments, the rice bran extract has about 5%-9% soluble solids. In some embodiments, the final solids level in the aqueous solution can be anywhere from 5 to 80% by weight depending upon the processing equipment used to dry the extract as well as the end use of the material. In some embodiments, the solids level can be 40-75% by weight for drying in a vacuum dryer (118) or for direct use as a liquid concentrate in finished application. In some embodiments, rice bran extract is evaporated to about 45-75%, about 50-75%, about 55-75%, about 60-75%, about 65-75%, about 70-75%, about 45-70%, about 45-65%, or about 45-60%, about 45-55% or about 45-50%. In some embodiments, the rice bran extract is evaporated to about 55-60% by weight of soluble solids. For example, a solids level of 40% or lower can be used for drying in case of a spray drying operation. In some embodiments, the moisture content of a dry powder made using the process described herein is less than 10% (e.g., about 9%, about 8%, about 7%, about 6%, about 5%, about 4%, about 3%, about 2% or about 1% moisture content).

In some embodiments, a dried form of rice bran extract can have the same functional and sensory attributes as the liquid concentrate or liquid extract prior to vacuum evaporation. In some embodiments, the rice bran extract can significantly enhance the water retention in meat, and seafood products when incorporated in meat/seafood matrix alone or along with other commonly added ingredients.

An exemplary process for producing rice bran extract comprises adding 1000 gallons of deionized water to about 2000 pounds of rice bran. In some embodiments, the pH is adjusted to between 1.2 and 1.8 (e.g., 1.5) using about 50 gallons of 20% hydrochloric acid. The mixture can be agitated in a batch tank for 1 hour at ambient temperature. In some embodiments, suspended solids are separated from the mixture using shaker screen followed by centrifugation and microfiltration steps. The resulting rice bran extract is subsequently processed using a cationic resin to remove divalent and trivalent cations. The pH of the rice bran extract is adjusted, in some embodiments to about pH 6.8 and 10.2 (e.g., 8.5), using 50% sodium hydroxide. The resulting rice bran extract, which can have approximately 4%-6% (e.g., 5%) soluble solids, can be evaporated using a low temperature evaporator under vacuum to about 48%-72% (e.g., 60%) soluble solids. In some embodiments, the rice bran extract concentrate is dried using a continuous vacuum belt dryer. In some embodiments, the dried rice bran extract is ground into fine particles, e.g., by using a hammer mill and packaged Compositions Comprising Rice Bran Extract Water retention of meat, poultry and seafood products are considered desirable as it leads to a tender and more favored textural attribute. A variety of binders such as starches, proteins are commonly used for water retention. However, these components result in a poor textural attribute of finished product. In some embodiments, the rice bran extract or compositions comprising the rice bran extract can improve the water retention along with enhanced textural attribute of finished product.

Rice bran is a nutrient-dense composition derived from the milling of rice. Rice bran is a rich source of protein, fat, carbohydrates, and a number of micronutrients such as vitamins, minerals, anti-oxidants and phytosterols.

Rice bran extract has the advantage of being all-natural and low in fat.

In some embodiments, the rice bran extract will comprise between 5-6% of total phosphorous content. In some embodiments, the rice bran extract will comprise between 3-9% total phosphorous content. In some embodiments, the total phosphorous content will be between about 3 and 9%, between about 3 and 8%, between about 3 and 7%, between about 3 and 6%, between about 3 and 5%, between about 3 and 4%, between about 4 and 9%, between about 5 and 9%, between about 6 and 9%, between about 7 and 9%, or between about 8 and 9%.

In some embodiments, the rice bran extract will comprise between about 0.03-0.1% calcium. In some embodiments, the percent calcium will be between about 0.03%-0.09%, between about 0.03%-0.08%, between about 0.03%-0.07%, between about 0.03%-0.06%, between about 0.03%-0.05%, between about 0.03%-0.04%, between about 0.04-0.1%, between about 0.05-0.1%, between about 0.06-0.1%, between about 0.07-0.1%, between about 0.08-0.1%, or between about 0.039-0.1%.

In one exemplary embodiment, the rice bran extract is characterized as followed in Table 1 (units in w/w):

TABLE 1

| Component | Before Process | After Process |
| --- | --- | --- |
| Moisture | 7-12 (%) | 1-12 (%) |
| Protein | 12-18 (%) | 4-12 (%) |
| Fat | 15-30 (%) | <0.2 (%) |
| Dietary Fiber | 20-30 (%) | 3-10 (%) |
| Ash | 5-10 (%) | 40-55 (%) |
| Carbohydrate | 30-50 (%) | 25-45 (%) |
| Calories | 250-400 kcal | 120-200 kcal |
| Total Phosphorous Content | 0.1-1.7 (%) | 3-9 (%) |
| Calcium | 0.03-0.06 (%) | 0.03-0.1 (%) |
| Sodium | 0.005-0.01 (%) | 10-18 (%) |

In some embodiments, the phosphate content of the rice bran extract can increase the water holding capacity of meat, by forcing the proteins apart, which in turn allows water to move in between protein molecules. In some embodiments, can be used in meat and seafood products for preservation of natural flavors.

In some embodiments, the rice bran extract is in a solid form, for example powder. In other embodiments, the rice bran extract is in a liquid form.

Certain embodiments relate to the use of composition comprising rice bran extract as a processing aid for meat products. By "meat product" is meant any animal based meat used for consumption or any other purpose by humans or animals. Meat products include, but are not limited to, pork, beef, sheep, poultry, and seafood. In some embodiments, the composition comprises rice bran extract alone or in combination to one or more natural additive.

According to some embodiments, the rice bran extract derived from rice bran using the process described herein delivers functional properties (e.g., textural and sensory attributes) to meat products that are unique and not easily mimicked by a single ingredient from a natural plant source currently known in the field. Functional properties include, but are not limited to, enhanced water retention by fresh and processed meats (e.g., pork, beef, sheep, poultry, and seafood products).

According to some aspects of the invention, the rice bran extract can alter the proteins in meat, poultry and seafood to increase the water retention capacity of the meat product. Increase in the water retention of meat products is achieved currently by variety of all-natural ingredients commonly used in the industry such as starches, cellulosic fibers, protein-based ingredients etc. These ingredients function by directly absorbing the additional water that cannot be captured by meat protein. Above mentioned ingredients tend to alter the texture and sensory attributes of the product to be characterized as more "mushy," "soft," "soapy," and perceived as undesirable textural and sensory characteristics.

According to embodiments of the invention, the rice bran extract compositions enhance water retention during storage and cooking. In some embodiments, the rice bran extract compositions described herein enhance the texture of the food product. In some embodiments, the rice bran extract compositions described herein enhance the flavor of the food product. Soluble components of rice bran include flavor compounds naturally extracted from rice bran that enhance the flavor of finished product.

In some embodiments, the rice bran extract improves the water retention along with enhanced textural attribute of the finished product. In some embodiments, the rice bran extract increases the firmness and chewiness of the product perceived as a desirable textural attribute. In some embodiments, the rice bran extract increases the hardness and chewiness of meat or seafood products to resulting in a meatier texture. The hardness and chewiness of a meat or seafood product can be measured using any method known in the art. In some embodiments, the texture of a meat product is characterized by measuring its hardness. In some embodiments, the hardness of a meat product is measured using a commercially available texture analyzer. In some embodiments, the texture of the meat product is compared to that of a control meat product. The control meat product may be treated with a synthetic ingredient that increases the phosphate concentration in the meat product. In some embodiments, the meat product treated with rice bran extract differs in hardness by less than 40%, less than 30%, less than 20% or less than 10% compared to the control meat product.

In some embodiments, the control meat product is not treated with a synthetic ingredient that increases phosphate concentration. In some embodiments, the control meat product is not treated. Meat products treated with rice bran extract show improved hardness compared to untreated meat products.

Because of the flavor components present in the rice bran extract, rice bran extract can enhance the flavor in the final meat and seafood products.

The methods and compositions of the present disclosure can be used to process a variety of meats including, but not limited to poultry, lamb, beef and pork, and seafood, including shrimp.

In some embodiments, the percent weight of dry extract ranges from 0.5% to 1.5% for poultry and meat depending upon the extent of functionality required for the application. For example, a typical usage can be 1% in meat applications. In seafood, in case of shrimp, a 5% solution can be used for thawing and soaking.

In some embodiments, the rice bran extract provides functional effects on the texture, slicing efficiency, flavor, water retention, reduced purge, extended shelf life due to reduced oxidation of a final meat or seafood product. Rice bran extract used at 0.5-1.5% provides significantly improved water retention, reduced purge, and slicing yields in processed meat products. Rice bran extract used at 1.0-1.5% significantly improves oxidation stability of meat products and extends shelf life by reducing rancidity.

In some embodiments, rice bran extract can be used alone or in combination with other meat treatments, such as for example, synthetic antioxidants, natural antioxidants, synthetic curing agents, natural curing agents, antimicrobials, pH buffering agents (e.g., commonly known organic or inorganic bases can be used to adjust pH including, but not limited to, sodium hydroxide, sodium carbonate, sodium bicarbonate, potassium hydroxide, ammonium hydroxide, and similar buffers known in the art), or any combinations of the foregoing.

In some embodiments, the rice bran extract compositions can be used in combination with other functional food or functional non-food ingredients. In some embodiments, the rice bran extract compositions can be used for its antioxidant properties due to the presence of natural phosphorous-based molecules in rice bran extract. In some embodiments, the rice bran extract can be used in combination with synthetic and natural antioxidants. Commonly used synthetic and natural antioxidants in industry include but are not limited to BHA, BHT, rosemary extracts, green tea extract and other plant-based polyphenols. In some embodiments, the rice bran extract has synergistic antioxidant properties when used in combination with other synthetic and natural antioxidants known in the art.

In some embodiments, the composition can comprise the rice bran extract and a source of nitrite. The nitrite source may be provided as a powder and may comprise a nitrite salt, such as sodium nitrite. In some embodiments, the composition may include synthetic or a natural nitrite. In some embodiments, the rice bran extract may be used in combination with a natural curing agent. The term "natural curing agent" refers to a plant based nitrite derived from plant material comprising nitrate by a process of preparing or converting the plant material substance. One such plant based curing agent is celery juice or powder, but many other plant materials can be used. The curing agent can be used to preserve or cure meat. For example, the natural curing agent can be sodium nitrite, sea salt, and blended thereof. In some embodiments, the rice bran extract can be used in combination with synthetic and/or natural curing agents in the curing process of meats resulting in a longer cured color retention of meat products and pet food products. In some embodiments, the rice bran extract has a synergistic effect when used in combination with synthetic or natural curing agents known in the art.

The compositions of the rice bran extract and the curing agent can be adjusted to deliver predetermined levels of rice bran extract and nitrite. In some embodiments, the concentration of the rice bran extract can range between about 45-70% by weight. In some embodiments, nitrite source can range between about 10-40% by weight. In some embodiments, the nitrite source may comprise between 1 and 3% of a nitrite salt (sodium nitrite, for example). As discussed above, nitrite salt derived from plant material (such, as celery, swiss chard, spinach, and beet, among many others) is a natural curing agent that can be combined with the rice bran extract to deliver a target concentration of nitrite in meat application. In some embodiments, the compositions may include rice bran extract, nitrite source, sea salt, and silicon dioxide. Silicon dioxide is used as an anticaking agent in this composition. Different compositions are used to deliver targeted levels of rice bran extract and sodium nitrite allowed by USDA regulations for different products. Specific non-limiting examples of such compositions are presented below (units are percent weight of the composition):

TABLE 2

| Composition 1: | Composition 2: |
|---|---|
| 1. Rice Bran Extract: 45-55% | 1. Rice Bran Extract: 45-55% |
| 2. Nitrite source: 20-30% (comprise 1-3% of a nitrite salt) | 2. Nitrite source: 10-20% (comprise 1-3% of a nitrite salt) |
| 3. Sea Salt: 20-30% | 3. Sea Salt: 30-40% |
| 4. Silicon dioxide: ≤2% | 4. Silicon dioxide: ≤2% |
| 5. To be used at 1-2% by weight in finished product to deliver 0.5-1.0% rice bran extract. | 5. To be used at 1-2% by weight in finished product to deliver 0.5-1.0% rice bran extract |

| Composition 3: | Composition 4: |
|---|---|
| 1. Rice Bran Extract: 60-70% | 1. Rice Bran Extract: 50% |
| 2. Nitrite source: 10-30% (comprise 1-3% of a nitrite salt) | 2. Nitrite source: 27.80% (comprising 1.5% of sodium nitrite) |
| 3. Sea Salt: 1-20% | 3. Sea Salt: 20.78% |
| 4. Silicon dioxide: ≤2% | 4. Silicon dioxide: 1.4% |
| 5. To be used at 1.5-2.0% by weight in finished product to delivery 1-1.4% rice bran extract and 5000-7800 ppm of e sodium nitrit | |

In some embodiments, the rice bran extract can be used in combination with antimicrobials used in meat industry to prolong the shelf life of meat products. Commonly used synthetic and natural antimicrobials include but not limited to sorbates, propionates, benzoates, lactates, acetates, diacetates, bacteriocins. In some embodiments, the rice bran extract has a synergistic effect when used in combination with synthetic and natural antimicrobials known in the art.

In some aspects, the rice bran extract can be used in beverages. In some embodiments, the rice bran extract can be used in high protein beverage. In some embodiments, the rice bran extract stabilizes the high protein content of the beverage. In some embodiments, the rice bran extract can be used in finished products such as coffee creamer, protein beverages and meal replacement beverage. In some embodiments, for beverage applications, the pH range of the rice bran extract can be adjusted to neutral pH. In some embodiments, for beverage applications, the final solid level can be 10% or lower than 10%.

In some embodiments, the rice bran extract can be used in cosmetics. For example, the rice bran extract can be used as a binder, an absorbent, an abrasive, a hair or skin conditioning agent, a surfactant, or a bulking agent.

In some embodiments, rice bran extract can be used as a cooking oil. In some embodiments, rice bran extract is used as a nutritional supplement or a component of a composition used to promote health. For example, in some embodiments, rice bran extract is used to support healthy blood sugar levels. Without being bound by theory, it is believed that the rice bran extract or oil improves insulin resistance, a risk factor for type 2 diabetes.

The rice bran extract can be delivered to or introduced into a food product in any manner that results in an effective amount of the rice bran being present in the food product. An effective amount refers to an amount that is necessary to achieve a desired result (e.g., water retention, flavor addition, stabilization of protein content, etc.). In some embodiments, the rice bran extract is present in a thawing solution. For example, frozen foods (e.g., shrimp) are thawed in a thawing solution. In some embodiments, the rice bran extract is present in a thawing solution. In some embodiments, the thawing solution has 0.25%, 0.5%, 0.75%, 1%, or between about 1% and about 2%, between about 2% and 3%, between about 3% and 4%, between about 4% and 5%, or even up to about 10% rice bran extract, or any integer between 5% and 10%. In some embodiments, the thawing solution comprises sodium chloride at between about 0.5% and about 10% by weight. In some embodiments, the thawing solution comprises sodium chloride at about 2%.

In some embodiments, the rice bran extract is delivered to a meat product by injection. In some embodiments, the injection delivers a composition, such as a brine or a pickle, comprising rice bran extract. For example, a brine solution comprising about 1.0% rice bran extract can be injected into chicken breast. In some embodiments, delivery of the rice bran extract to the meat product is passive. For example, in some embodiments, the meat product is marinated in a composition comprising the rice bran extract. The weight extension (i.e., the increase in weight of the meat product) resulting from delivery of the rice bran extract is between about 5% and 25%. For example, the weight extension in some embodiments after injection of the rice bran extract containing brine solution is about 15%. In some embodiments, the brine solution further comprises sodium tripolyphosphate (STPP) at about a 0.3% final concentration. In other embodiments, the STPP final concentration is between about 0.1% and 0.5%. Meat products that are suited for injection of a brine solution comprising rice bran extract include, but are not limited to, chicken, ham, smoked sausage, and cured turkey "ham."

In some embodiments, the pickle comprises, in addition to rice bran extract, sea salt, turbinado sugar, celery juice powder, acerola juice powder, and vinegar powder. The pH of the pickle can be between 5.0 and 11.0. In some embodiments, the pH of the pickle can be between 5.0 and 10.5, between 5.0 and 10, between 5.0 and 9.5, between 5.0 and 9.0, between 5.0 and 8.5, between 5.0 and 8.0, between 5.0 and 7.5, between 5.0 and 7.0, between 5.0 and 6.5, between 5.0 and 6.0, or between 5.0 and 5.5. In some embodiments, the pH of the pickle can be between about 5.5 and 11.0, between about 6.0 and 11.0, between about 6.5 and 11.0, between about 7 and 11.0, between about 7.5 and 11.0, between about 8 and 11.0, between about 8.5 and 11.0, between about 9 and 11.0, between about 9.5 and 11.0, between about 10 and 11.0, or between about 10.5 and 11.0.

In some embodiments, a brine or pickle solution is mixed with the meat product. Such a solution comprising rice bran extract is effectively incorporated into ground meats, such as ground chuck, ground pork, ground turkey, and other ground or extruded meats or meats used in making sausage or hot dogs. For example, a brine solution comprising rice bran extract can be mixed with a meat product (e.g., ground chuck, ground turkey, etc.) having a final concentration of 0.5%-1.5% by weight of rice bran extract. In some embodiments, the brine solution is prepared and mixed to result in a weight extension of the meat product between 5% and 25%. In some embodiments, the weight extension of the meat product is between about 5% and 20%, between about 5% and 15%, between about 5% and 10%, or between about 10% and 25%, between about 15% and 25%, or between about 20% and 25%.

In some embodiments, the rice bran extract can be added to a meat product to increase water retention in the meat product. Increased water retention can contribute to increased cooked weight yield (i.e., the ratio of the weight of the cooked meat product compared to the weight of the raw meat product, often expressed as a percentage). In some embodiments, the cooked weight yield of a meat product treated with rice bran extract is between about 70% and 95%, between about 75% and 95%, between about 80% and 85%, or between about 90% and 95%, or between about 70% and 90%, between about 70% and 85%, between about 70% and 80%, or between about 70% and 75%, or even about 95% or greater. In some embodiments, water retention in a meat product treated with rice bran extract is compared to water retention in a meat product treated with untreated meat. In some embodiments, the cooked weight yield of a meat product compared to an untreated product prepared in identical conditions is at least 5% greater. In some embodiments, the cooked weight yield of a treated meat product compared to an untreated meat product is between about 1% to 5% greater, between 1% and 4% greater, between 1% and 3% greater, between 1% and 2% greater, between 2% and 5% greater, between about 3% and 5% greater, or between about 4% and 5% greater. In some embodiments, meat products treated with rice bran extract can have a percent purge even less than about 1%.

In some embodiments, the water retention is measure or otherwise characterized in such a way as to enable one skilled in the art to ascertain improvements in water retention. For example, measuring the cooked weight yield of a meat product treated with rice bran extract and an untreated (or alternatively treated) meat product prepared (i.e., cooked) in the same conditions can allow a determination of differences in water retention of the two meat products. Cooking conditions can include temperature, length of cooking, and, in some embodiments, even the cooking apparatus. In some embodiments, the cooked weight yield is dose dependent (i.e., the greater the amount of rice bran extract, the greater the yield). Purge, or the expulsion of water or other fluid, from a meat product can also be measured. In some embodiments, meat products treated with rice bran extract have a decreased purge compared to untreated meat products. Percent purge for untreated meat products can be above 5%. In some embodiments, meat products treated with rice bran extract can have a percent purge less than between about 1% to 5%, between 1% and 4%, between 1% and 3%, between 1% and 2%, between 2% and 5%, between about 3% and 5%, or between about 4% and 5%. In some embodiments, meat products treated with rice bran extract can have a percent purge even less than about 1%.

Meat products contain significant amount of fat content that can lead to rancidity over time. Rancidity is oxidation of fat and results in undesirable flavor development that leads to a lower quality of meat and reduced shelf life of product. Antioxidants that reduce the level of oxidation in the meat product can be of great commercial importance. The level of oxidation present in meats can be determined by measuring the amounts of peroxide present in a sample. Values for the amount of peroxide oxygen per kilogram can be expressed as milliequivalents per kilogram (mEq/kg). Meat products treated with rice bran extract, in some embodiments, have decreased levels of oxidation. Methods for determining the amount of peroxide in a meat product are well known in the art.

The color of meat can be measured using any method known in the art. In some embodiments, meat color retention is determined by visual inspection and comparison to a standard, such as a control meat product with a known color retention (e.g., a meat product treated with a synthetic agent such as a synthetic phosphate source). One standardized method for measuring the internal color of a meat product is using the Hunter Lab color system, wherein the "L" value corresponds with lightness in the meat, the "a" variable corresponds to the amount of green and red in the meat, and the "b" variable corresponds to the amount of yellow and blue in a sample. In some embodiments, meat products treated with rice bran extract have comparable or improved L, a, and/or b values compared to controls. In some embodiments wherein the color of meat is determined by the Hunter Lab color system, the determined values for a meat product treated with rice bran extract and a control meat product differ by less than 20%, less than 15%, less than 10%, or even less than 5%. In some embodiments, the determined values of a control meat product are about the same.

Other physical properties that are considered when determining the quality of a meat product include, but are not limited to, hardness and texture. Meat products treated with rice bran extract have improved texture and hardness in some embodiments. One measure for quantitating texture of a meat product is determining the slicing yield. Processed meats such as ham, turkey, etc. are often sold as thin slices made using commercial slicing machines. Slicing yield is the number of intact slices of meat product in total number of slices. Slicing yield is of commercial importance as a low slicing yield results in damaged slices with diminished value. In some embodiments, hardness of a meat product can be determined using methods known in the art including, but not limited to, the Texture Profile Analysis. In some embodiments, meat products treated with rice bran extract have improved texture profiles compared to untreated meat products.

Example 1—Rice Bran Extract Production Process 2000 lbs. of locally sourced fresh rice bran were added to 1000 gallons of deionized water and pH was adjusted to 1.5 using approximately 50 gallons of 20% Hydrochloric acid. Mixture was agitated in a batch tank for 1 hour at 150° F. Suspended solids were separated from the mixture using shaker screen followed by centrifugation and microfiltration steps. The resulting rice bran extract was processed using cationic resin to remove divalent and trivalent cations. Rice bran extract was pH adjusted to pH 8.5 using 50% sodium hydroxide. Resulting rice bran extract with approximately 5% soluble solids was evaporated using a low temperature evaporator under vacuum to 60% soluble solids. Rice bran extract concentrate was dried using a continuous vacuum belt dryer. The dried rice bran extract was further ground into fine particles using a hammer mill and packaged.

Example 2—Effect of Rice Bran Extract on Yield

Frozen shrimp without any additives was obtained from a local store. A thawing solution containing 5% rice bran extract and 2% sodium chloride by weight was prepared using DI water. Frozen shrimp was weighed and added to thawing solution at 20:80. Shrimp was allowed to completely thaw. Thawed shrimp was separated from brine solution using a US 20 mesh screen. Weight of thawed shrimp is recorded. A soaking solution was prepared in the following ratio—15% ice, 25% thawing solution, 60% shrimp by weight. Thawed shrimp was added to soaking solution and stirred every 5 minutes for 15 minutes. Shrimp was separated from soaking solution using US 20 mesh and weight was recorded. Shrimp was stored at refrigeration temperature for 24 hours. Weight was recorded for calculating 24 hour yield. Shrimp was cooked using a steam cooker for 15 minutes. Cooked shrimp weight was recorded for cook yield.

Figure 2:
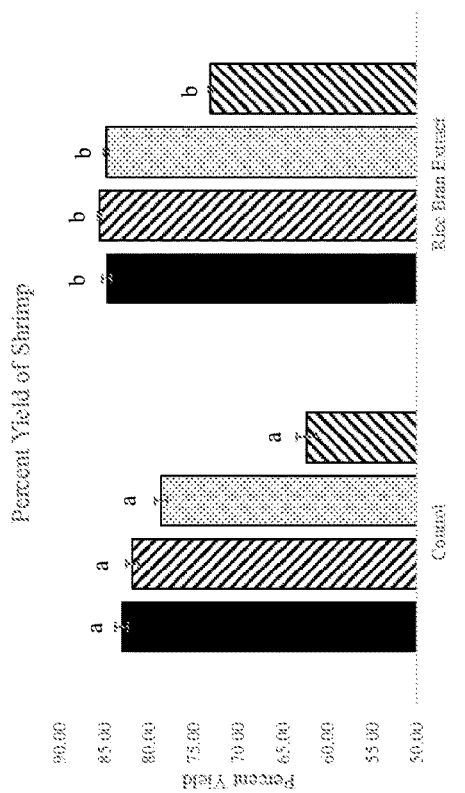
FIG. 2 is a graph showing the yield of shrimp with and without Rice Bran Extract according to some embodiments of the invention.

In FIG. 2, rice bran extract results in a higher yield of shrimp at various stages of processing. The term "yield" as used herein refers to the ratio of cooked weight to green (uncooked) weight.

Figures 8, 9:
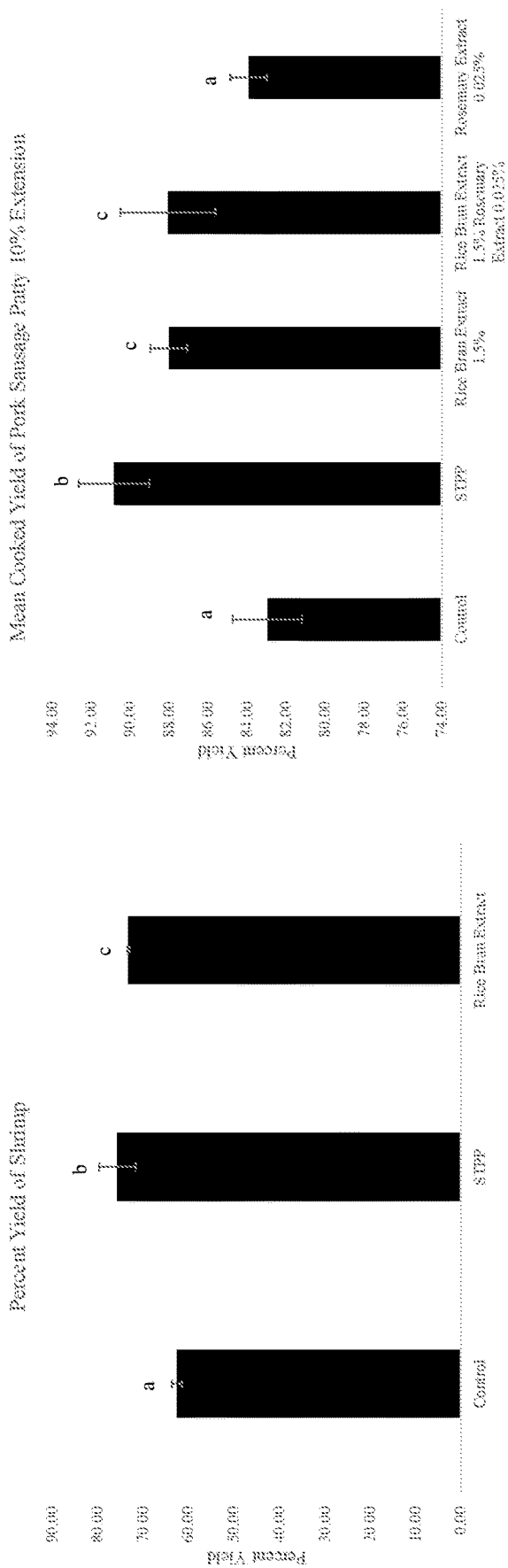
FIG. 8 is a graph showing the mean cooked yield of shrimp.
FIG. 9 is a graph showing the mean cooked weight yield of pork sausage patty.

The rice bran extract treated shrimp was superior to the untreated control in cooked weight yield. Rice bran extract was similar to, though slightly less than STPP soaked shrimp. The means for each treatment were significantly different from each other as seen in FIG. 8.

A significant water retention by shrimp protein is observed in presence of rice bran extract as the components of rice bran extract interact with shrimp proteins to modify its solubility and functional properties.

Figures 4, 5:
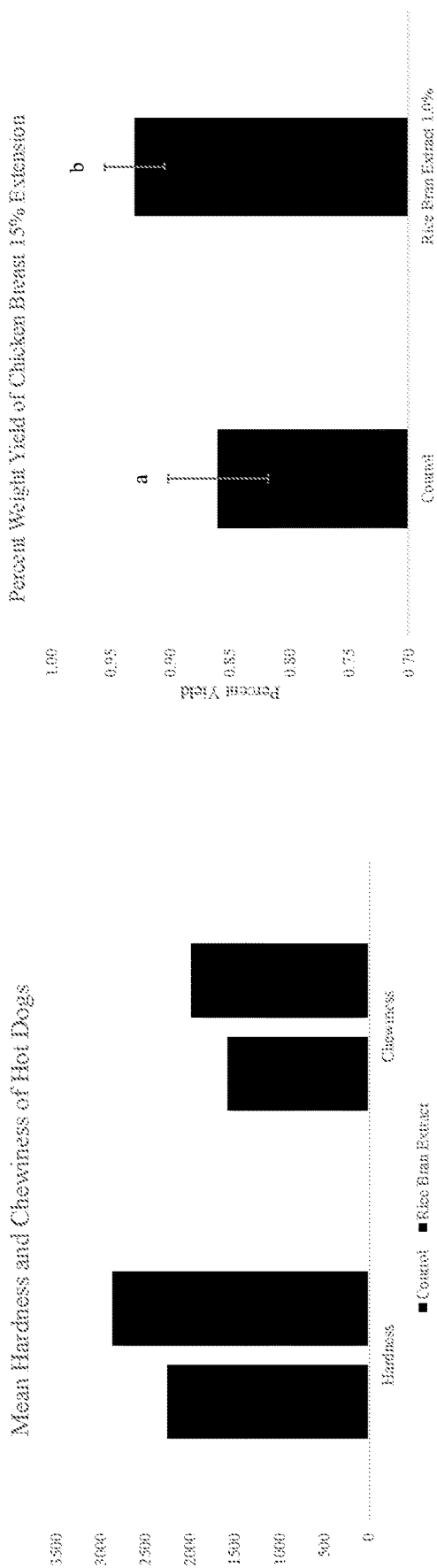
FIG. 4 is a graph showing the effect of rice bran extract on the texture of hotdogs according to some embodiments of the invention.
FIG. 5 shows a graph of percent yield of chicken breast injected with rice bran extract.

Similar results have been observed with poultry products. Refrigerated chicken breast without any additives was purchased locally. Brine solutions of sodium chloride (control) and a combination of sodium chloride and rice bran extract were made. Injection at an increase of 15% in green weight delivered a 1% dose of rice bran extract based on weight. Each individual chicken breast was weighed and the appropriate amount of brine to inject was calculated. Each chicken breast was injected and weighed until the 15% weight extension was achieved using a handheld brine injector. The brine injector was cleaned before each treatment. The chicken breasts were then placed in individual vacuum bags and sealed without vacuum with a Foodsaver® brand vacuum sealer. The packaged chicken breasts were then placed in a Daniels Food Equipment DVTS 30 vacuum tumbler for 30 minutes at 0.4 inHg. The chicken breasts were then stored overnight in refrigerator at 40° F. The chicken breast was then removed from the packaging and cooked in a Lang Platinum oven at 400° F. until an internal temperature of 165° F. was obtained. FIG. 5 shows that after cooking a 9.75% yield was achieved over control.

Example 3—Effect of Rice Bran Extract on Purge

Purge of water from hotdogs was evaluated. Hotdogs were treated with different levels of rice bran extract, phosphate, or no treatment. The hotdogs were prepared in pilot plant and packaged. Each package consists of eight pieces. The purge was measured by the following method. The entire package was weighed. Then the package was opened, the hotdogs were removed, dried of any liquid, and weighed. The packaging material was then dried and weighed. The weight of the dried hotdogs and dried packaging were added and subtracted from the total weight. The difference is the amount of purge in the package. The purge was then divided by the weight of the hotdogs and a percentage by weight was calculated as percent purge.

In FIG. 3, hotdogs with and without rice bran extract show a significant difference in purge over shelf life. Purge is referred to as the free water in the hotdogs packages that is considered undesirable to the retail customer. Addition of rice bran extract improved the water retention capacity of hotdogs reducing the purge.

Example 4—Effect of Rice Bran Extract on Textural Properties

The texture of the hotdogs was evaluated by measuring the hardness of the product using the Stable Micro Systems TA.XT texture analyzer. The measurements were taken using the Stable Micro Systems Exponent software, using the Texture Profile Analysis (TPA) test. Briefly, the TPA test compresses the hotdogs twice in succession and measures the force associated with each compression. The force measured on the first compression is considered the hardness of the hotdog. The hotdogs were prepared for testing by cutting a 1" section from multiple hotdogs. The hotdogs were then placed vertically on the testing platform (as a cylinder standing on its flat end). A 1" acrylic cylinder was used to compress the hotdogs. The hardness was measured and compared between treatments.

In FIG. 4, the effect of rice bran extract on textural properties of hotdogs is demonstrated. Addition of rice bran extract resulted in significant difference in textural attributes of hot dogs specifically higher hardness and chewiness. These improved textural attributes are considered desirable by experts in the field.

Example 5—Rice Bran Extract and Poultry

Chicken breasts free of any additives were locally sourced. The chicken breasts were injected to 1.0% by weight of rice bran extract at 15% weight extension. After injection, individual breasts were sealed in a plastic vacuum bag without applying vacuum. The bagged chicken was then tumbled for one hour in a vacuum tumbler at 0.4 Bar. Tumbled chicken was refrigerated overnight, until it was weighed and cooked to an internal temperature of 165° F. (about 74° C.). The cooled, cooked chicken was weighed again. The ratio of cooked vs raw weight was calculated and reported as cooked weight yield.

Figures 6, 7:
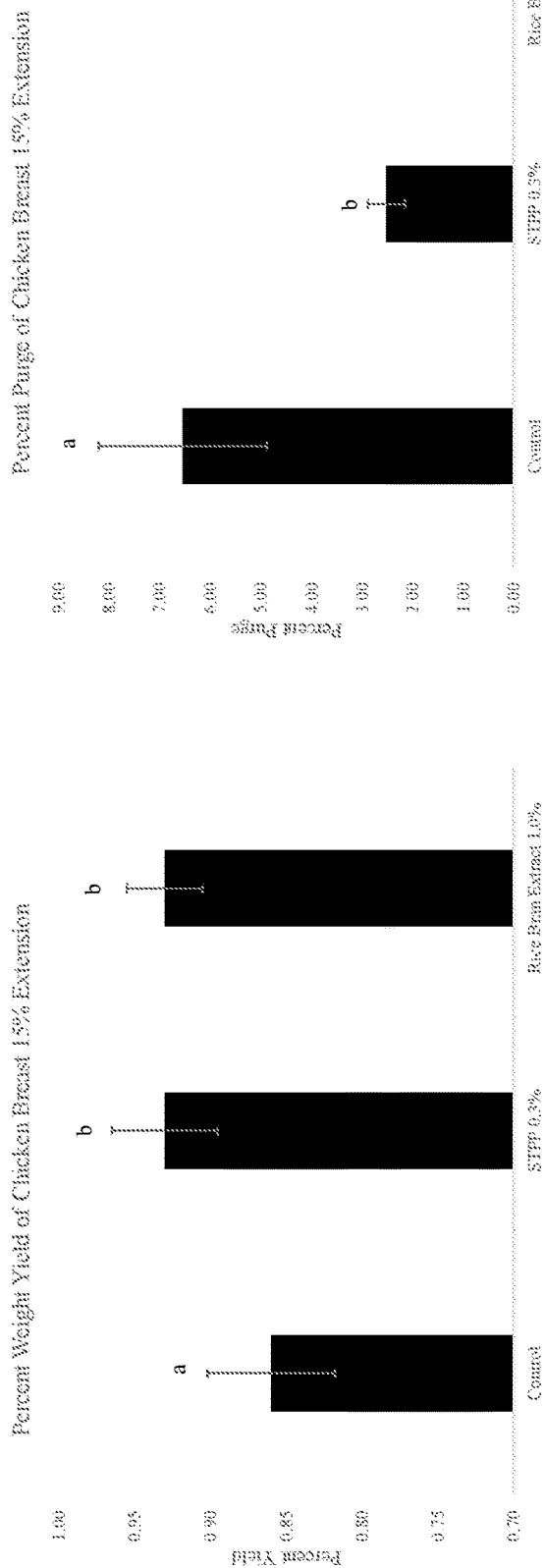
FIG. 6 is a graph showing mean cooked weight yield of injected chicken breasts with STPP or with rice bran Extract.
FIG. 7 is a graph showing the mean percentage purge of chicken breast.

The yield of the rice bran extract treated chicken (FIG. 6) was equivalent to the weight yield of STPP treated chicken. Both the STPP and rice bran extract treated breasts retained significantly more water than the control. The difference in means was analyzed by z-test. FIG. 6 shows no significant difference between STPP and rice bran extract, while there is a difference between rice bran extract and control.

Purge of injected breasts was also tested. The chicken was treated as described above. Prior to cooking, the entire package was weighed. The chicken was removed, free water removed using a paper towel, and reweighed. The packaging was dried and reweighed. The weight of the chicken and packaging was subtracted from the total weight and the difference was reported as purge. Purge was divided by the raw weight of chicken breast and a percentage was calculated.

The loss of water (FIG. 7) by the raw chicken was similar between the STPP and rice bran extract treatments. Again, both outperformed the control.

Example 6: Rice Bran and Pork Sausage Patty

Pork butt was purchased at a local supermarket. The supermarket butcher boned and ground the meat upon request. The pork butt was purchased the afternoon before making samples the next day. The pork was tested for cooked weight yield and oxidation. Rosemary extract was used to compare to the antioxidative capability of rice bran extract.

The ground pork butt was divided into six treatments: control, rice bran extract 1.5%, rosemary extract 0.005%, rosemary extract 0.01%, rice bran extract 1.5%+rosemary 0.005% and rice bran extract 1.5%+rosemary extract 0.01%. For each treatment enough of a salt brine was made to extend the weight by ten percent. The STPP and rice bran extract was dissolved in the brine. The rosemary extract was added directly to the meat due to the lipophilic nature of the extract.

The brines were added at the start of mixing and were mixed for four minutes. Then patties of approximately 100 g each were formed and weighed. The patties were cooked at 400° F. for 14 minutes to a target internal temperature of 165° F. (about 74° C.). After cooking the patties were cooled to room temperature and a final weight taken. The ratio of cooked to raw weight was calculated.

FIG. 9 illustrates the cooked yield results for the pork sausage patty. The STPP had the highest cooked yield followed by the two rice bran extract containing treatments. The STPP and rice bran extract treatments were all significantly different than the control. Rosemary extract had no contribution to cooked yield, as the rosemary extract treatment was similar to the control and was not significantly higher in the treatment combined with rice bran extract.

For oxidation a raw patty from each treatment was frozen at −80° C. as a pre-cooked time 0. An average of all raw samples was taken to represent the entire meat block. A patty immediately after cooking was frozen as cooked time 0. Patties from each treatment were refrigerated while stored. Samples were taken every seven days. At each time point the samples were frozen at −80° C. and shipped for peroxide value at NP Analytical Laboratories in St. Louis, MO.

Figure 10:
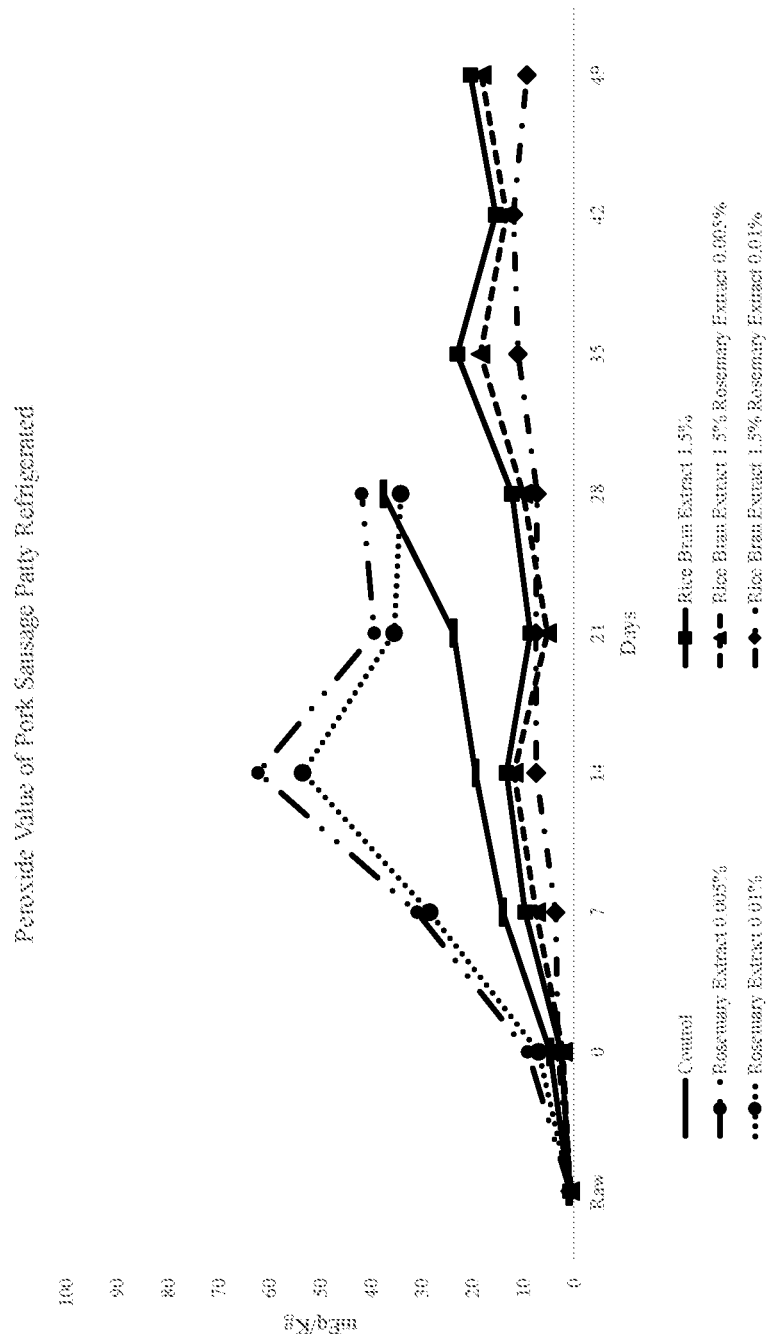
FIG. 10 is a graph showing the peroxide value of refrigerated pork sausage patties.

The rice bran extract treated ground pork showed a protective effect through the cooking process. It also exhibited a continuing protective antioxidant effect over time. This is likely due to the chelating activity of the rice bran extract binding the available iron ions. It may also bind other metal ions present in the pork. FIG. 10 provides a graphic representation of the results.

Example 7: Rice Bran Extract and Ground Turkey Breast

Turkey breasts were purchased and ground upon request at a local supermarket. The ground turkey was separated into three treatments: control, STPP, and rice bran extract. Salt brines were made with each treatment ingredient and mixed into the ground turkey for four minutes. The ground turkey was then formed into approximately 100 g patties and the weight recorded. The patties were cooked for 14 minutes at 400° F. The patties were cooled to room temperature and weighed again. The cooked yield was calculated by dividing the cooked weight by the raw weight.

Figures 11, 12:
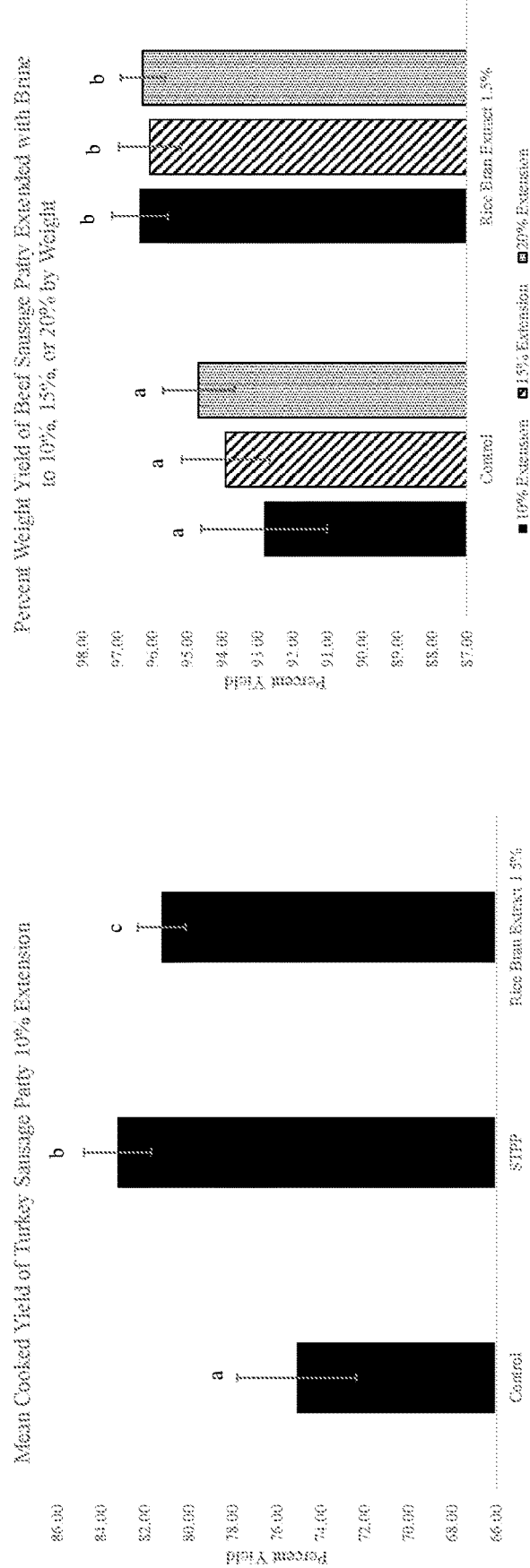
FIG. 11 is a graph showing the mean cooked weight yield of turkey sausage patty.
FIG. 12 is a graph showing the mean cooked weight yield of beef sausage patty.

The results in FIG. 11 show that the rice bran extract performed similarly to the STPP treated turkey. Both the STPP and rice bran extract treatments were significantly better than the control.

Example 8: Rice Bran Extract and Beef Sausage Patty

Chuck roasts were purchased and ground upon request at a local supermarket. The ground chuck roast was separated into three treatments: control, STPP, and rice bran extract. Three tests at different weight extension (10, 15, or 20%) were performed. Salt brines were made with each treatment ingredient and mixed into the ground chuck roast for four minutes. The ground chuck roast was then formed into approximately 100 g patties and the weight recorded. The patties were cooked for 14 minutes at 400° F. The patties were cooled to room temperature and weighed again. The cooked yield was calculated by dividing the cooked weight by the raw weight.

The rice bran extract performed similarly to the STPP treated chuck roast. In each extension level, both the STPP and rice bran extract treatments were significantly better than the control while significantly the same within the same level of extension (FIG. 12).

Example 9: Rice Bran Extract and Ham

Ham was injected with a pickle and extended 20% by weight. The pickle consisted of sea salt, turbinado sugar, celery juice powder, acerola juice powder, vinegar powder, and the appropriate test ingredient. The pH was measured for each (Table 3). Hams were vacuum tumbled, stuffed and cooked. Cooked yield was calculated as well as slice yield. Slice yield was calculated based on the number of intact slices out of thirty slices. The internal color was measured using the Hunter Lab scale.

TABLE 3 pH of pickle for each treatment.

| Treatment | pH |
| --- | --- |
| Control | 5.58 |
| Phosphate 0.45% | 6.05 |
| Rice Bran Extract 0.5% | 5.75 |
| Rice Bran Extract 1.0% | 5.83 |
| Rice Bran Extract 1.5% | 6.05 |

Figures 13, 14:
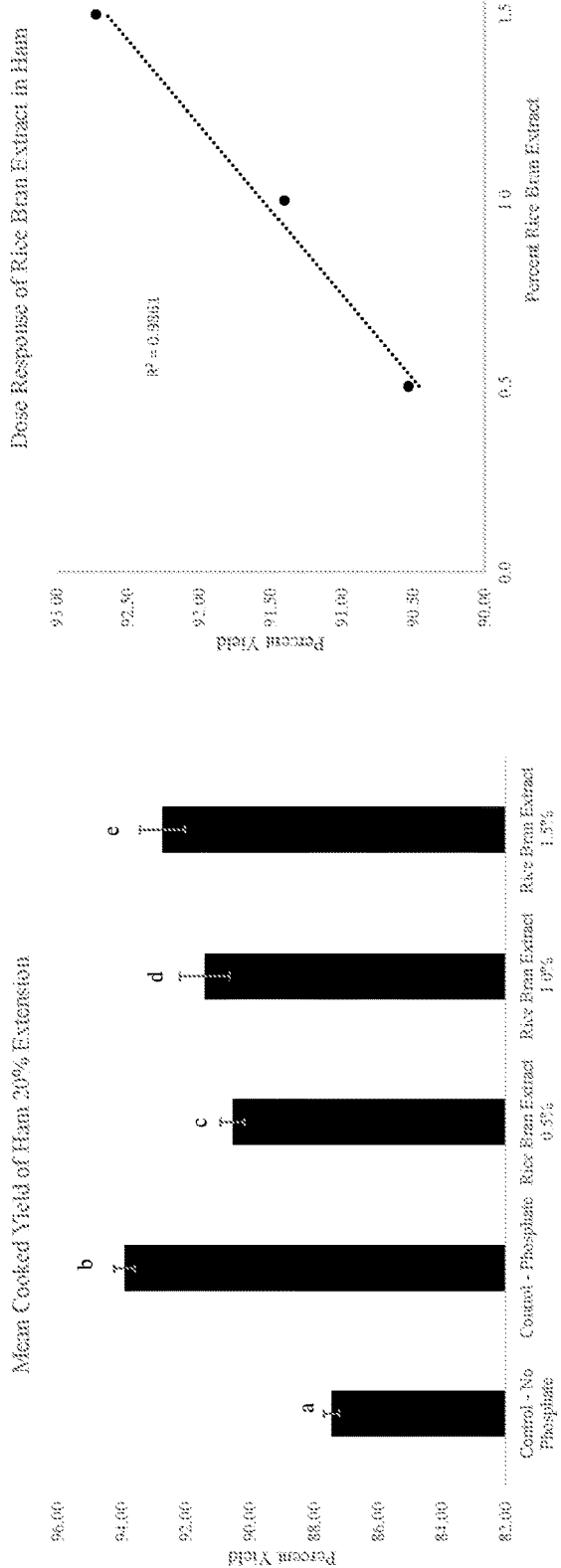
FIG. 13 is a graph showing the mean cooked weight yield of ham.
FIG. 14 is a graph showing the dose response of rice bran extract in ham.

Cooked yield showed a significant increase with the addition of rice bran extract (FIG. 13). This shows that the rice bran extract is functioning as intended by holding water in the ham. Cooked yield increased with increase in concentration of rice bran extract from 0.5% to 1.5% rice bran extract. Each level of rice bran extract was significantly different than the control and each other.

The increase in rice bran extract concentration in ham showed a linear dose response in cooked yield. This further illustrates the functionality of rice bran extract. FIG. 14 illustrates the linearity of the cooked yield as the dose increased.

Figure 15:
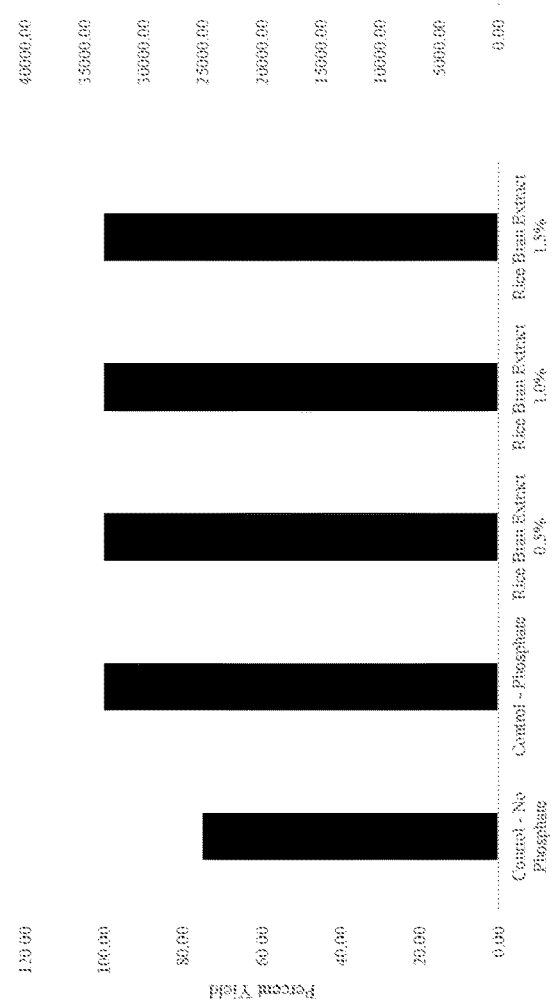
FIG. 15 is a graph showing the mean slice yield of ham.

Mean slicing yield for control was at 75% while the treatments containing phosphate and rice bran extract significantly increased to 100% without any loss in slices showing functionality in texture improvement (FIG. 15).

Figure 16:
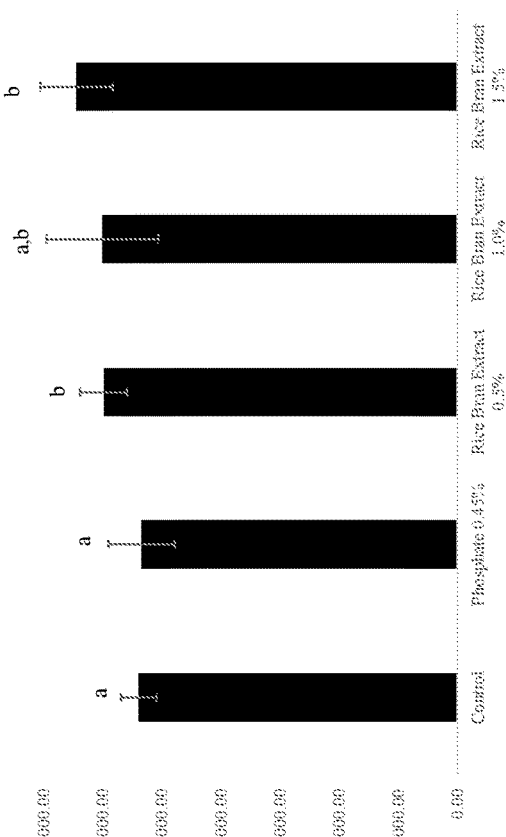
FIG. 16 is a graph showing the mean hardness of ham.

The texture/hardness was measured by Texture Profile Analysis (TPA). Hardness is the maximum force measured when a sample is compressed. FIG. 16 contains the mean hardness data for each treatment. While the hardness was similar across treatments, rice bran extract containing treatments were slightly higher in hardness.

Figure 18:
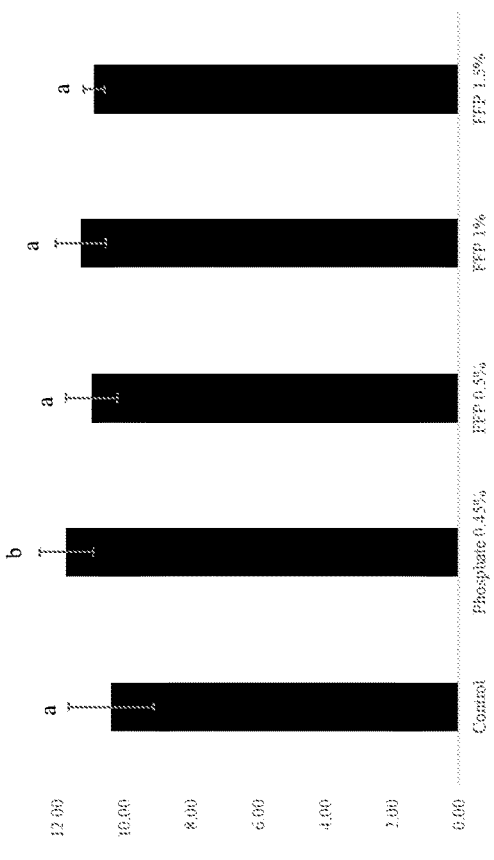
FIG. 18 is a graph showing internal a value of ham.
Figure 17:
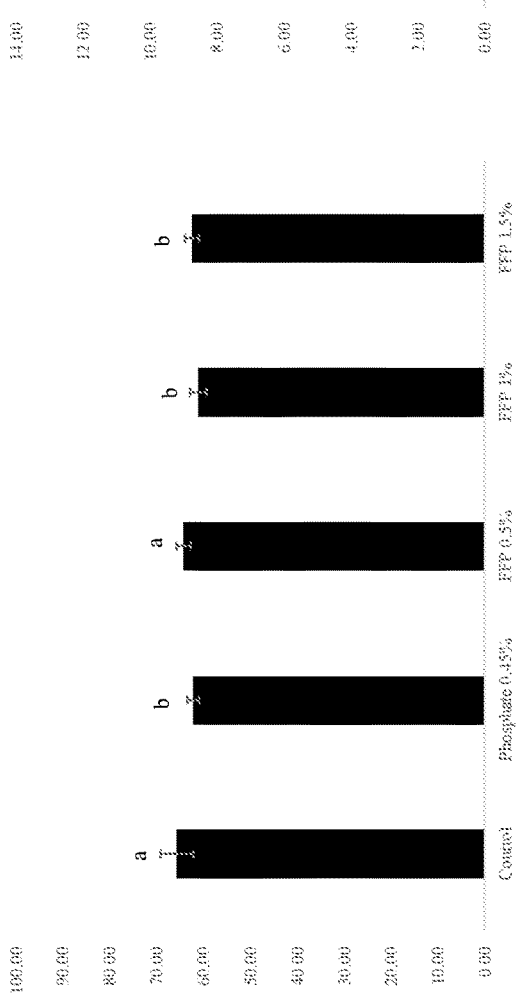
FIG. 17 is a graph showing the internal L value of ham.
Figure 19:
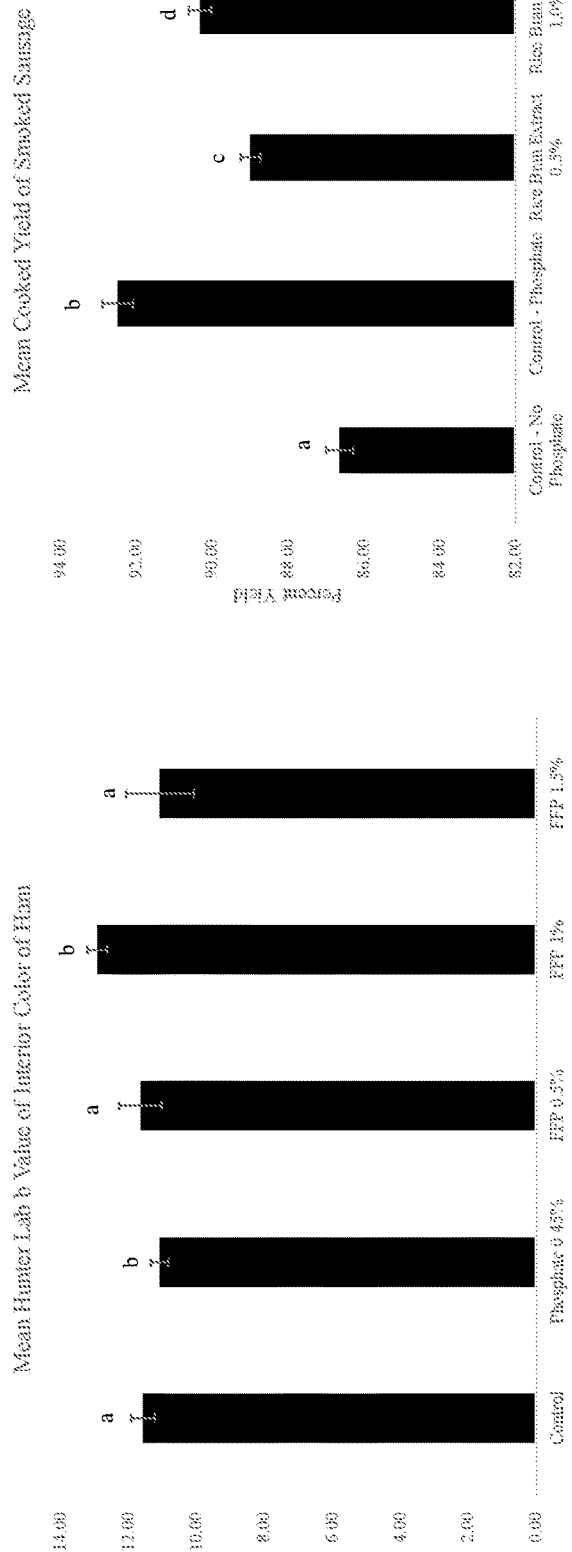
FIG. 19 is a graph showing the internal b value of ham.

The internal color of the ham was measured using the Hunter Lab color space. In the Hunter Lab system, the L value corresponds with the lightness, a corresponds with red/green, and b with yellow/blue. FIGS. 17, 18, and 19 contain the means for each value. The phosphate and rice bran extract treatments were slightly darker than the control.

Treatments were informally evaluated by appearance, texture and taste. Observations are reported in Table 2. Evaluation found all treatments to be similar with the rice bran extract 1.5% treatment a little dryer than the others.

Example 10: Rice Bran Extract and Smoked Sausage

Smoked sausage was made from pork and injected with a pickle containing sea salt, flavorings, turbinado sugar, celery juice powder, acerola juice powder, vinegar powder, and the appropriate test ingredient. Process and cooking procedures were not provided at this time.

Figure 20:
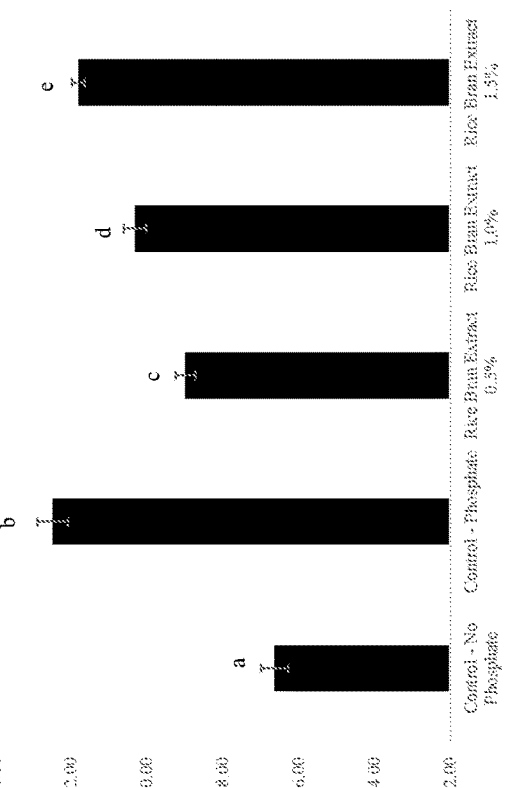
FIG. 20 is a graph showing the mean cooked weight yield of smoked sausage.

FIG. 20 contains the data for cooked weight yield of the sausages. The control had the lowest yield. As was observed in ham, the yield among the rice bran extract treatments showed a significantly higher cooked yield compared to control demonstrating functionality. The weight yield was also significantly different between all treatments in the smoked sausage. Of the rice bran extracts, composition comprising 1.5% rice bran resulted in highest yield.

Figure 21:
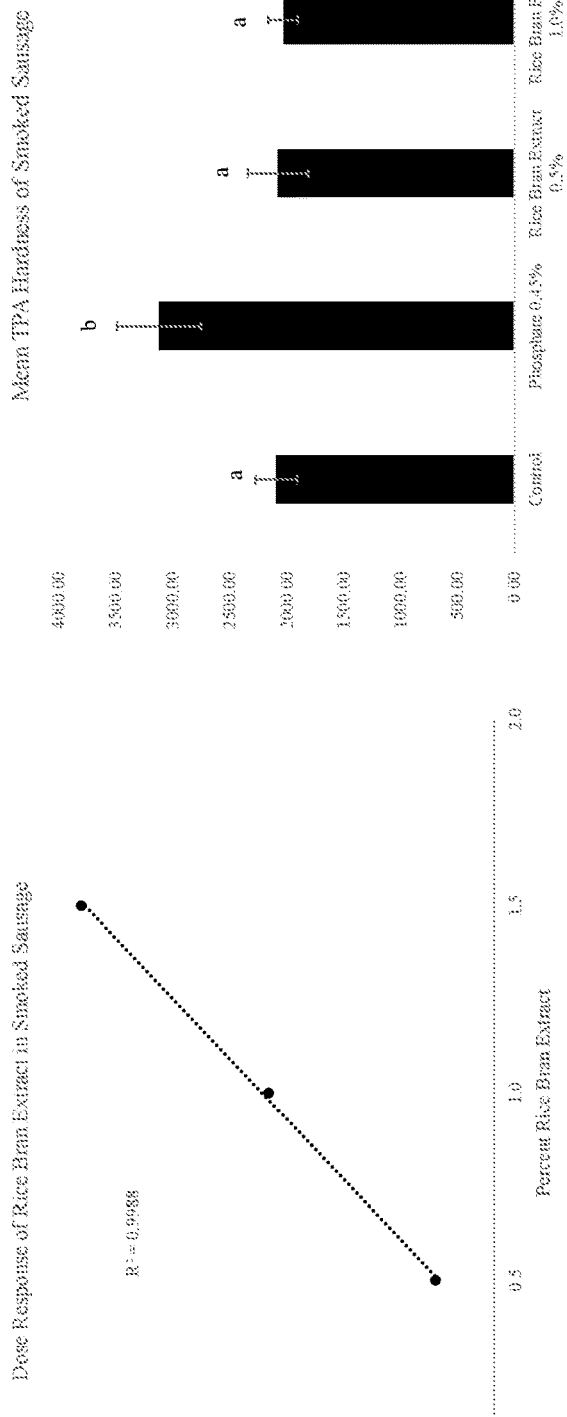
FIG. 21 is a graph showing the dose response of rice bran extract in smoked sausage.

As in the ham, smoked sausage also displayed a linear dose response among the rice bran extract treatments. This can be seen in FIG. 21 below.

Figure 22:
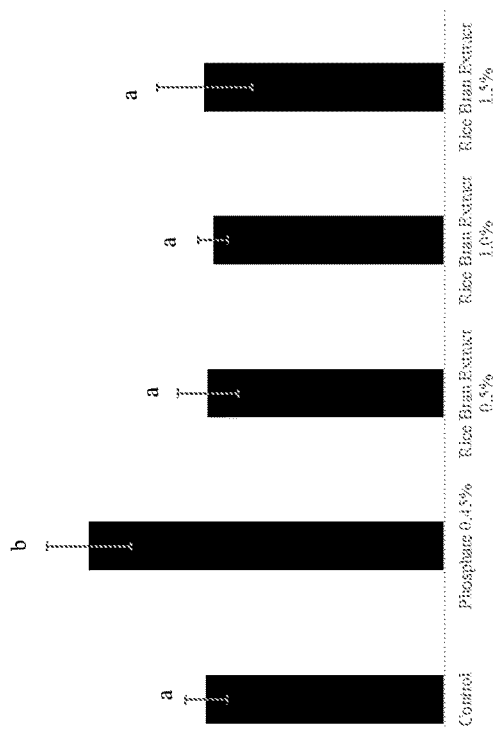
FIG. 22 is a graph showing the mean hardness of smoked sausage.

Texture(hardness) was measured by Texture Profile Analysis (TPA). Hardness is the maximum force measured when a sample is compressed. FIG. 22 contains the mean hardness data for each treatment.

Figure 23:
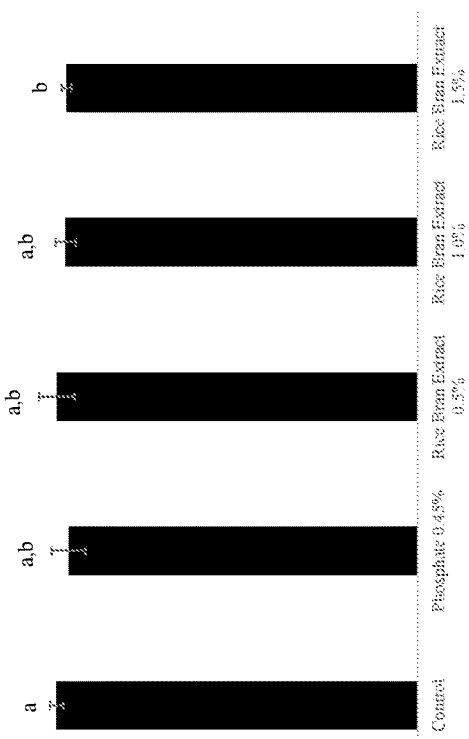
FIG. 23 is a graph showing the internal L value of smoked sausage.
Figure 24:
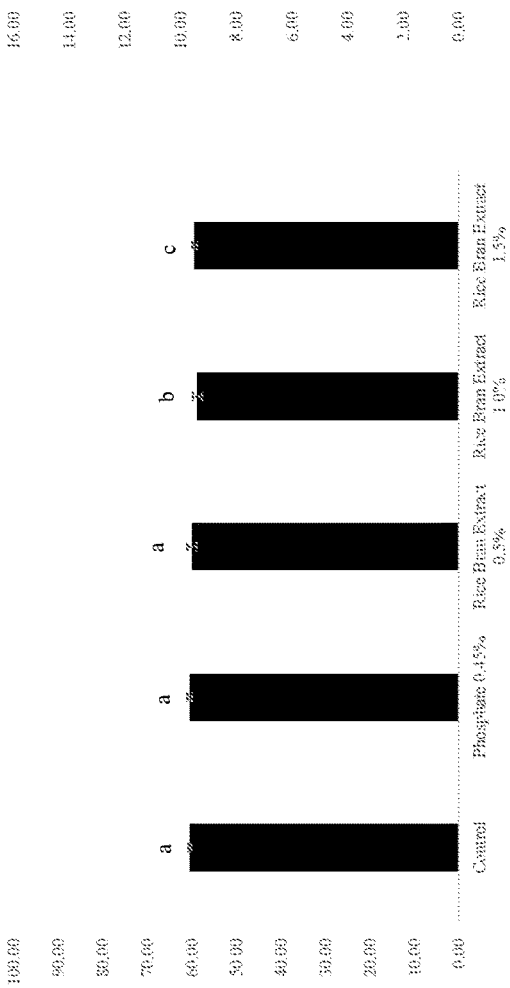
FIG. 24 is a graph showing internal a value of smoked sausage.
Figures 25, 26:
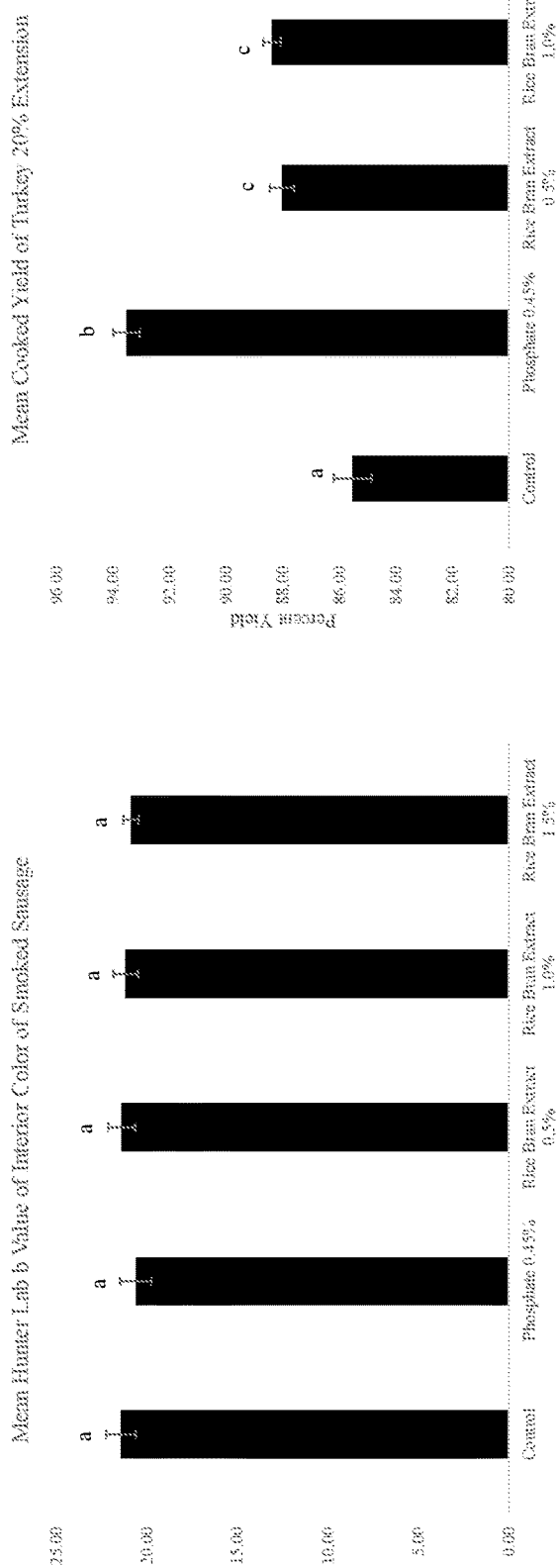
FIG. 25 is a graph showing the internal b value of smoked sausage.
FIG. 26 is a graph showing the mean cooked weight yield of turkey.

The internal color of the smoked sausage was measured using the Hunter Lab color space. In general, the turkey became slightly darker with the addition of phosphate or rice bran extract. FIGS. 23-25 show that the smoked sausage internal Lab values were relatively steady.

Treatments were evaluated the informally for appearance, texture and taste. Observations are reported in Table 4. Evaluation found all treatments to be similar with acceptable flavor.

TABLE 4

Informal sensory evaluation of smoked sausage.

| Treatment | Remarks |
| --- | --- |
| Control | Loose texture, exterior appearance rough, flavor acceptable |
| Phosphate 0.45% | Tighter texture, smooth and shiny exterior appearance, flavor acceptable |
| Rice Bran Extract 0.5% | Loose texture, exterior appearance rough, flavor acceptable |
| Rice Bran Extract 1.0% | Moderate texture, exterior appearance rough, flavor acceptable |
| Rice Bran Extract 1.5% | Firmest texture of all test treatments, exterior appearance smoother than all other test treatments but not as smooth as phosphate control, flavor acceptable |

Example 11: Rice Bran Extract and Turkey

A cured turkey "ham" was also made. Turkey breast was injected with a pickle and extended 20% by weight. The pickle consisted of sea salt, turbinado sugar, celery juice powder, acerola juice powder, vinegar powder, antioxidant, and the appropriate test ingredient. Pickle pH is seen in Table 5. Turkey was vacuum tumbled, stuffed and cooked. Cooked yield was calculated as well as slice yield. Slice yield was calculated based on the number of intact slices out of thirty slices.

TABLE 5 pH of pickle for each treatment.

| Treatment | pH |
| --- | --- |
| Control | 7.10 |
| Rice Bran Extract 0.5% | 6.57 |
| Rice Bran Extract 1.0% | 6.52 |
| Rice Bran Extract 1.5% | 6.47 |

Figure 27:
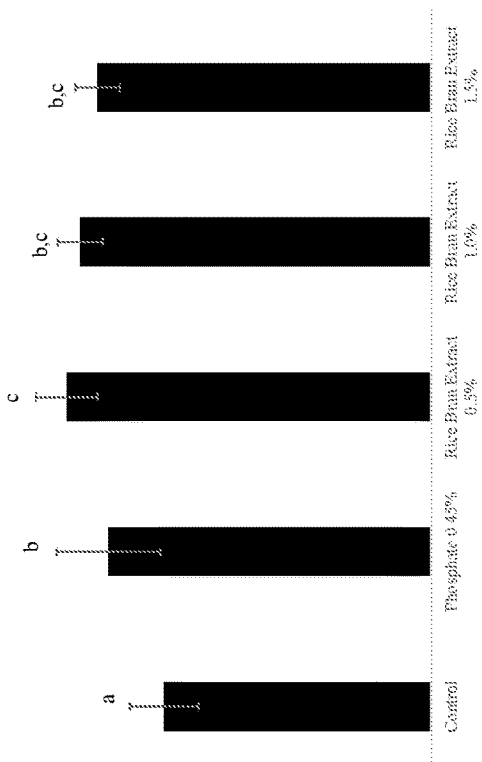
FIG. 27 is a graph showing the response of rice bran extract in turkey.

FIG. 26 shows that the rice bran extract performed better than the control in cooked weight yield. Rice bran extract in turkey showed a slight dose response (FIG. 27), but, not as well as in the ham or smoked sausage. With the exception of rice bran extract 0.5% compared to rice bran extract 1.0%, all treatments were significantly different. Slicing of turkey was superior to control, and matched phosphate at the 1.5% treatment level.

Figure 28:
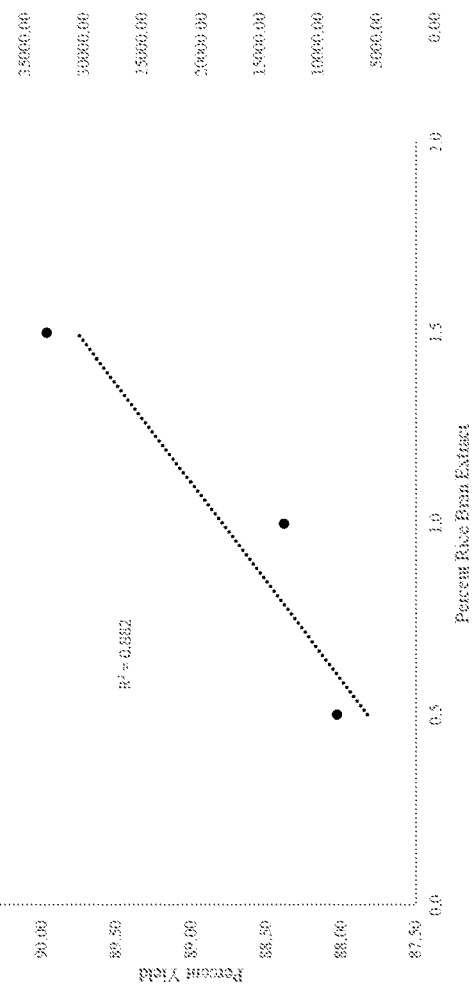
FIG. 28 is a graph showing the mean hardness of turkey.

Hardness was measured by Texture Profile Analysis (TPA). Hardness is the maximum force measured when a sample is compressed. FIG. 28 contains the mean hardness data and analysis for each treatment. The hardness for all rice bran extract treatments and phosphate were different than the control. Within rice bran extract and phosphate treatments there was mainly no significant difference.

Figure 30:
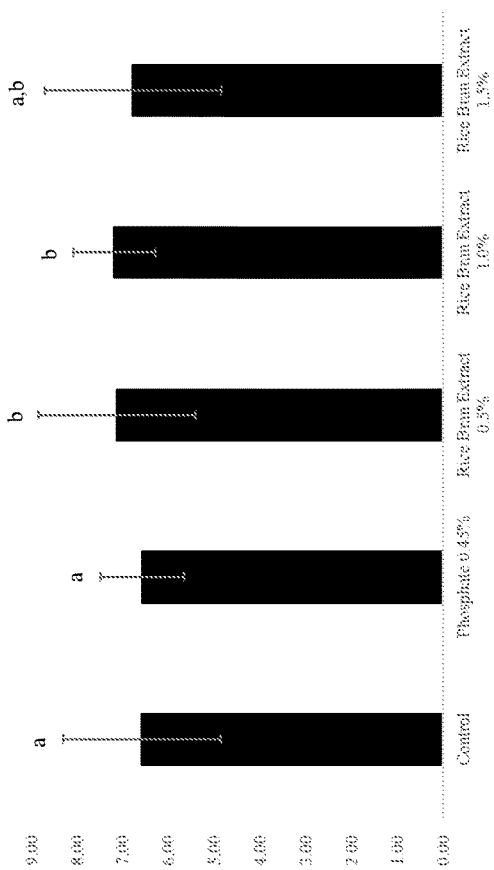
FIG. 30 is a graph showing internal a value of turkey.
Figure 29:
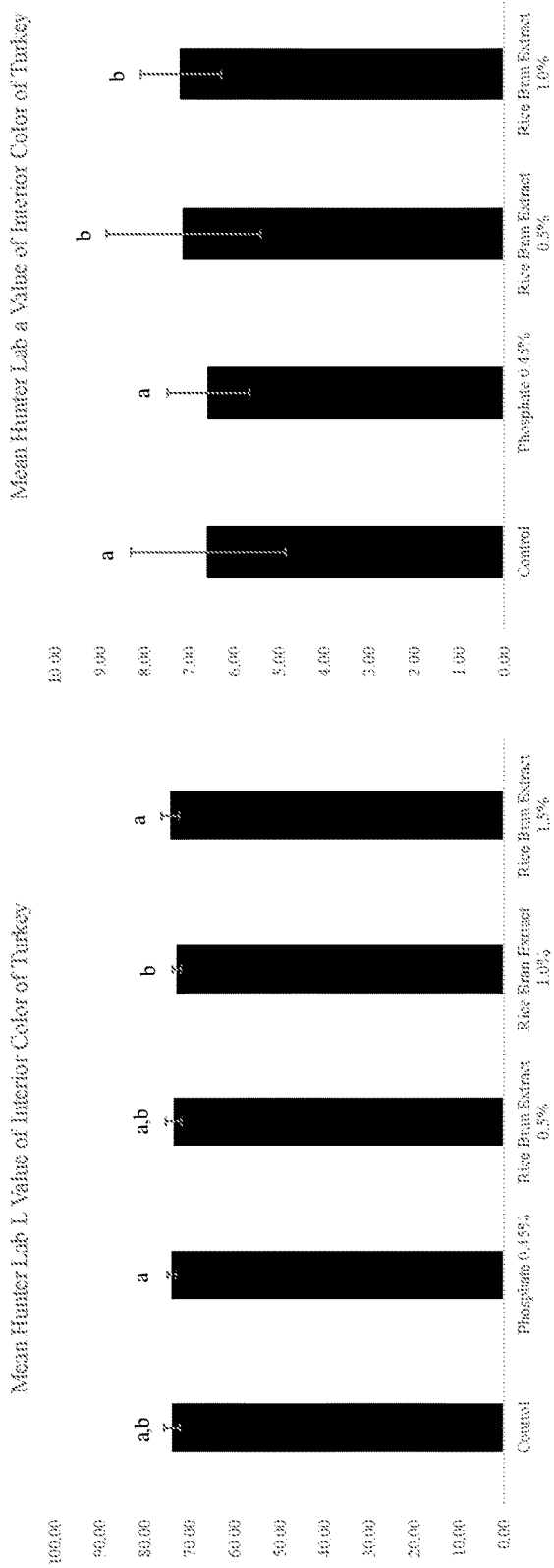
FIG. 29 is a graph showing the internal L value of turkey.
Figure 31:
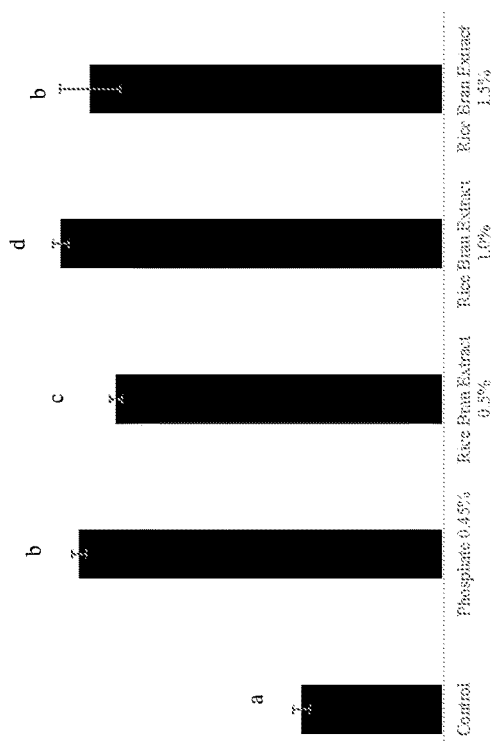
FIG. 31 is a graph showing the internal b value of turkey.

The internal color of the smoked sausage was measured using the Hunter Lab color space. In turkey the lightness remained relatively steady (FIGS. 29-31).

Treatments were evaluated informally for appearance, texture and taste. Observations are reported in Table 6. Evaluation found the rice bran extract similar to control or phosphate, with some noticeable dryness in the rice bran extract 1.5% treatment.

TABLE 6

Informal sensory evaluation of turkey.

| Treatment | Remarks |
| --- | --- |
| Control | Softest texture, typical flavor, appearance similar to all treatments |
| Phosphate 0.45% | Firmer texture than other control, typical flavor, appearance similar to all treatments |
| Rice Bran Extract 0.5% | Sufficient bind, good flavor, appearance similar to all treatments |
| Rice Bran Extract 1.0% | Sufficient bind, a bit dry, good flavor, appearance similar to all treatments |
| Rice Bran Extract 1.5% | Sufficient bind a little drier than other treatments, appearance similar to all treatments |

Example 12: Rice Bran Extract and Hot Dogs

It is desirable to retain water in emulsified meat products, such as hot dogs, as well. Beef 85s was passed through a kidney plate followed by a ½" plate. Beef 50s was also processed in the same manner. The beef 85s was mixed with salt, sodium nitrite, and half of the ice/water. Either sodium phosphate, rice bran extract (0.5%, 1.0%, or 1.5%), or nothing was added. This was held overnight in the cooler.

This lean mixture was chopped in a bowl chopper. Then the beef 50s, mustard, spice, antimicrobial, and remaining half of ice/water was added and an emulsion created. The emulsion was stuffed into cellulose casings. A standard cook program was used to cook the hot dogs, then cooled and casings removed. They were placed in the cooler for storage.

Yield

Figure 32:
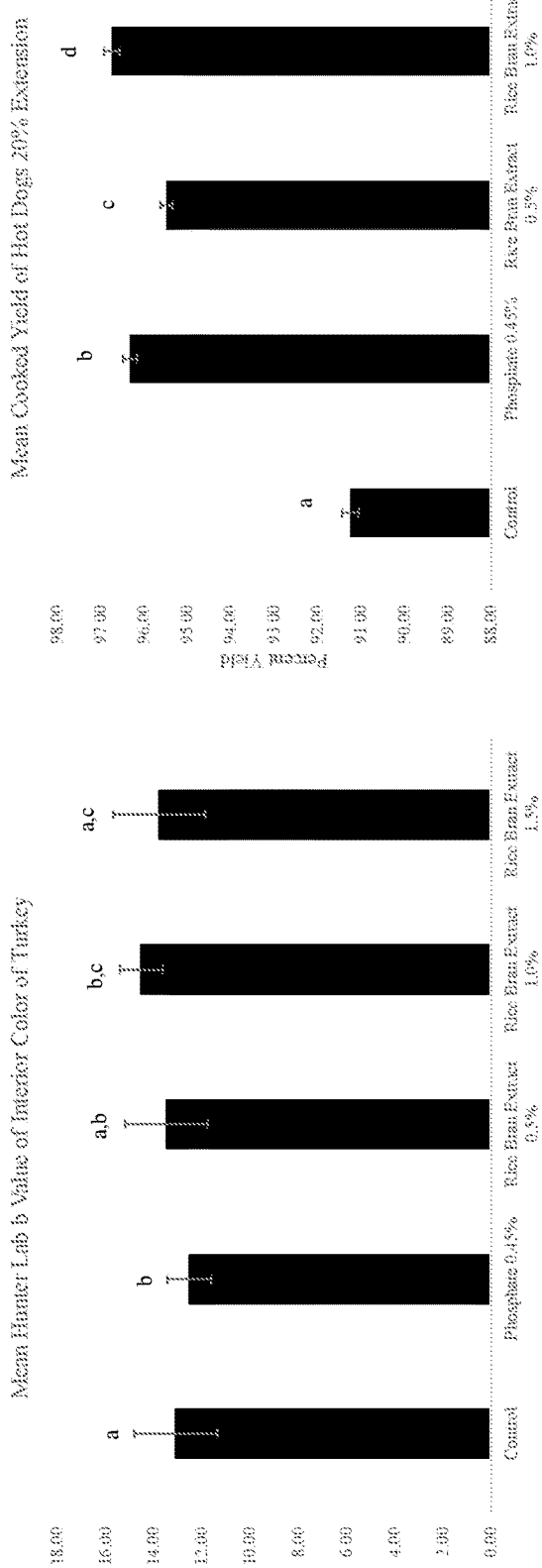
FIG. 32 is a graph showing the cooked weight yield of hot dogs.

The percent cooked weight yield of the hot dogs was calculated by dividing the pre-cooked weight by the cooked weight and multiplying by 100. The rice bran extract treated hot dogs were significantly higher in weight yield than the control (FIG. 32). The 1.0% and 1.5% rice bran extract treated hot dogs were as good as, or better than the STPP treated hot dogs. In the case of the 1.0% rice bran extract treatment, the weight yield was significantly higher than the phosphate treated hot dogs. The 1.5% rice bran extract treated hot dogs had the same weight yield as phosphate treated hot dogs.

Hardness

Figures 33, 34:
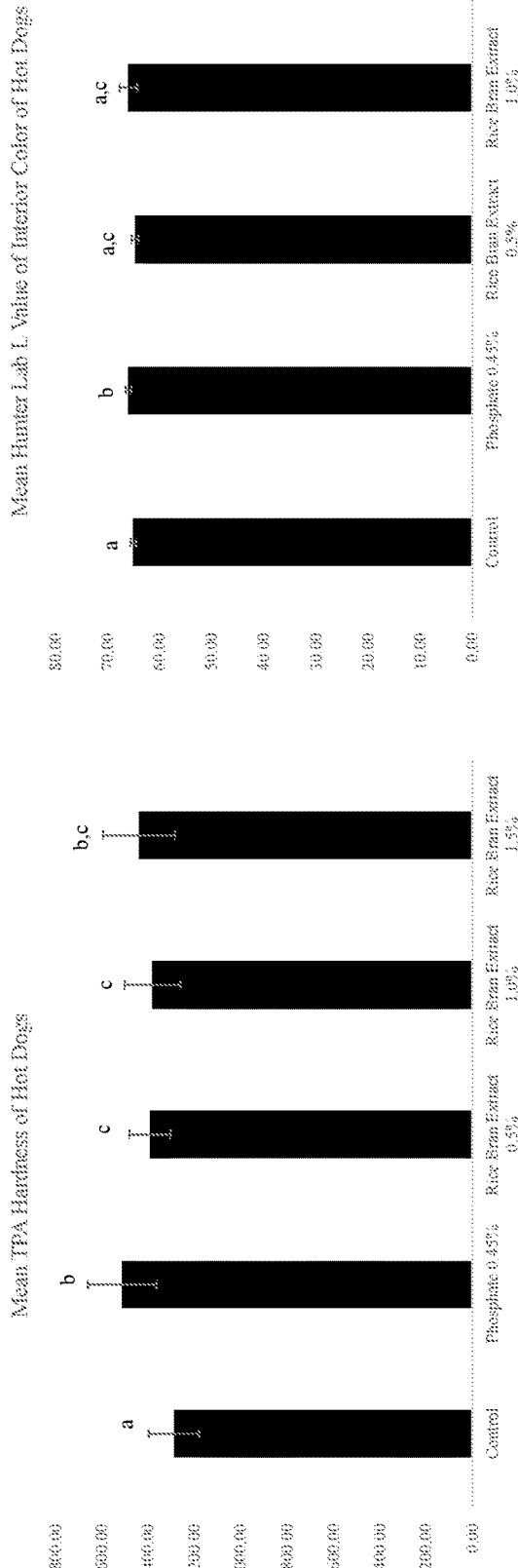
FIG. 33 is a graph showing the hardness of hot dogs.
FIG. 34 is a graph showing the internal L value of hot dogs.

The texture/hardness was measured by Texture Profile Analysis (TPA). Hardness is the maximum force measured when a sample is compressed. FIG. 33 contains the mean hardness data and analysis for each treatment. The hardness for all rice bran extract treatments and phosphate were different than the control. Within rice bran extract treatments there was no significant difference. There was no significant difference between the phosphate and rice bran extract at 1.5%.

Internal Color

Figures 35, 36:
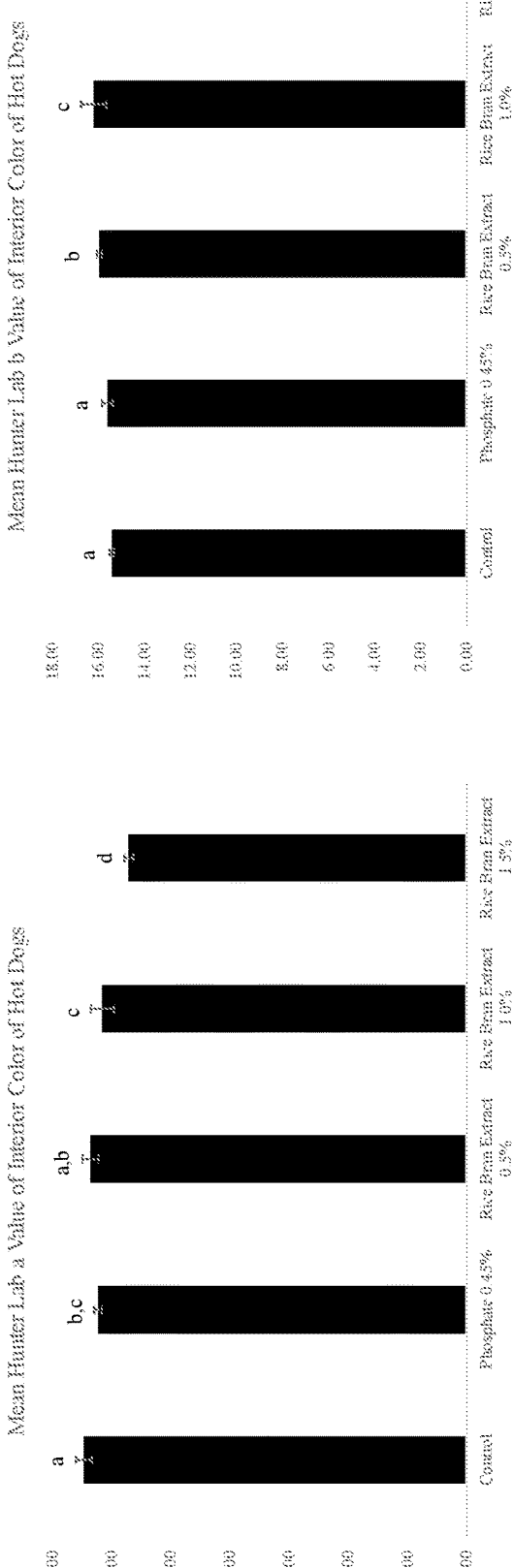
FIG. 35 is a graph showing internal a value of hot dogs.
FIG. 36 is a graph showing the internal b value of hot dogs.

The internal color of the smoked sausage was measured using the Hunter Lab color space. In hot dogs the lightness remained relatively steady (FIGS. 34-36).

The examples set forth above are provided to give those of ordinary skill in the art with a complete disclosure and description of how to make and use the preferred embodiments of the compositions and are not intended to limit the scope of the invention. Modifications of the above-described modes (for carrying out the invention that are obvious to persons of skill in the art) are intended to be within the scope of the following claims. All publications, patents, and patent applications cited in this specification are incorporated herein by reference as if each such publication, patent or patent application were specifically and individually indicated to be incorporated herein by reference.

What is claimed is:

1. A composition comprising a soluble rice bran extract, the soluble rice bran extract having between about 3% and about 9% (w/w) total phosphorous content and being present in an amount effective to improve one or more properties selected from a cooked weight yield, water retention, a textural attribute, a hardness, oxidation stability, reduced purge, slicing yields, and a shelf life of a meat product or a seafood product, the total phosphorous content being from natural phosphorous-based molecules in the soluble rice bran extract.

2. The composition of claim 1, comprising from about 45% (w/w) to about 70% (w/w) soluble rice bran extract.

3. The composition of claim 2, comprising from about 1% (w/w) to about 40% (w/w) sea salt.

4. The composition of claim 1, further comprising one or more of at least one antioxidant or at least one antimicrobial agent.

5. The composition of claim 4, wherein the at least one antioxidant comprises one or more of butylated hydroxyanisole (BHA), butylated hydroxytoluene (BHT), rosemary extracts, green tea extract and other plant-based polyphenols, and wherein the at least one antimicrobial agent comprises one or more of sorbates, propionates, benzoates, lactates, acetates, diacetates, and bacteriocins.

6. The composition of claim 1, wherein the soluble rice bran extract comprises from about 0.003% to about 0.08% (w/w) total calcium content.

7. The composition of claim 1, wherein the soluble rice bran extract comprises from about 15% to about 22% (w/w) total sodium content.

8. The composition of claim 1, wherein the soluble rice bran extract has 120-150 kcal.

9. The composition of claim 1, wherein the soluble rice bran extract is present in an amount such that a cooked weight yield of the meat product or seafood product treated with the soluble rice bran extract is at least 5% greater than a control comprising an untreated cooked meat product or seafood product.

10. A composition comprising (a) a soluble rice bran extract having between about 3% and about 9% (w/w) total phosphorous content and (b) a natural curing agent comprising a nitrite source, the total phosphorous content being from natural phosphorous-based molecules in the soluble rice bran extract.

11. The composition of claim 10, wherein the soluble rice bran extract is present in a sufficient amount to improve one or more properties selected from water retention, a textural attribute, a hardness, oxidation stability, reduced purge, slicing yields, and a shelf life of a meat product or a seafood product.

12. The composition of claim 10, comprising from about 45% (w/w) to about 70% (w/w) soluble rice bran extract.

13. The composition of claim 12, comprising from about 1% (w/w) to about 40% (w/w) sea salt.

14. The composition of claim 10, further comprising one or more of at least one antioxidant or at least one antimicrobial agent.

15. The composition of claim 14, wherein the at least one antioxidant comprises one or more of butylated hydroxyanisole (BHA), butylated hydroxytoluene (BHT), rosemary extracts, green tea extract and other plant-based polyphenols, and wherein the at least one antimicrobial agent comprises one or more of sorbates, propionates, benzoates, lactates, acetates, diacetates, and bacteriocins.

16. A composition comprising a soluble rice bran extract, the soluble rice bran extract having between about 3% and about 9% (w/w) total phosphorous content, the total phosphorous content being from natural phosphorous-based molecules in the soluble rice bran extract.

* * * * *